(12) United States Patent
Kurohata

(10) Patent No.: US 9,858,515 B2
(45) Date of Patent: Jan. 2, 2018

(54) IMAGE FORMING APPARATUS, IMAGE FORMING SYSTEM, IMAGE FORMATION CONTROL METHOD AND IMAGE FORMING METHOD

(71) Applicant: Konica Minolta, Inc., Chiyoda-ku, Tokyo (JP)

(72) Inventor: Takao Kurohata, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/971,241

(22) Filed: Dec. 16, 2015

(65) Prior Publication Data

US 2016/0180205 A1 Jun. 23, 2016

(30) Foreign Application Priority Data

Dec. 18, 2014 (JP) ................................ 2014-255810

(51) Int. Cl.
*G06K 15/00* (2006.01)
*G03G 15/00* (2006.01)

(52) U.S. Cl.
CPC ..... *G06K 15/4085* (2013.01); *G03G 15/5012* (2013.01); *G03G 15/70* (2013.01)

(58) Field of Classification Search
None
See application file for complete search history.

(56) References Cited

U.S. PATENT DOCUMENTS

| | | | |
|---|---|---|---|
| 9,342,898 B2 * | 5/2016 | Kitai | G06T 7/408 |
| 2006/0198676 A1 * | 9/2006 | Kimura | G03G 15/234 |
| | | | 399/401 |
| 2010/0046977 A1 * | 2/2010 | Inenaga | H04N 1/00408 |
| | | | 399/81 |
| 2011/0135325 A1 * | 6/2011 | Hitaka | G03G 15/70 |
| | | | 399/21 |
| 2012/0170087 A1 * | 7/2012 | Nose | B65H 3/5223 |
| | | | 358/498 |

(Continued)

FOREIGN PATENT DOCUMENTS

| | | |
|---|---|---|
| JP | 2005-132049 A | 5/2005 |
| JP | 2011-063398 A | 3/2011 |

(Continued)

OTHER PUBLICATIONS

Office Action (Notice of Reasons for Refusal) dated Dec. 27, 2016, by the Japanese Patent Office in Japanese Patent Application No. 2014-255810, and an English Translation of the Office Action (21 pages).

(Continued)

*Primary Examiner* — John Wallace
(74) *Attorney, Agent, or Firm* — Buchanan Ingersoll & Rooney PC

(57) ABSTRACT

An image forming apparatus includes an image forming unit, a conveying unit and a control unit, the control unit has a function of image formation correcting of performing correction of the image forming unit in response to a reading result of an image on the transfer medium, and a function of prepurge processing of, when a paper jam occurs, performing control to discharge a valid medium located on a downstream side of a position where the paper jam occurs to outside the conveyance path and discharge a medium located on an upstream side of the position where the paper jam occurs to outside the conveyance path, and, when the paper jam occurs, and the medium being conveyed includes a medium for correction to be used for image formation correcting, the control unit performs control to perform the prepurge processing and continue the image formation correcting.

20 Claims, 17 Drawing Sheets

(56) References Cited

U.S. PATENT DOCUMENTS

| | | | | |
|---|---|---|---|---|
| 2013/0321517 A1* | 12/2013 | Kubota | ............... | B41F 33/00 347/19 |
| 2014/0146367 A1* | 5/2014 | Kodama | ............ | H04N 1/405 358/3.06 |
| 2014/0168701 A1 | 6/2014 | Kato | | |

FOREIGN PATENT DOCUMENTS

| | | | | |
|---|---|---|---|---|
| JP | 2011-126017 A | * | 6/2011 | ............ G03G 21/00 |
| JP | 2011-227353 A | | 11/2011 | |
| JP | 2014-117912 A | | 6/2014 | |
| JP | 2014-164011 A | | 9/2014 | |

OTHER PUBLICATIONS

Office Action issued in corresponding Chinese Patent Application No. 201510938957.5, dated Aug. 9, 2017, with English Translation (12 pages).

* cited by examiner

IMAGE FORMING APPARATUS, IMAGE FORMING SYSTEM, IMAGE FORMATION CONTROL METHOD AND IMAGE FORMING METHOD

CROSS-REFERENCE TO RELATED APPLICATIONS

The present application claims priority under 35 U.S.C. §119 to Japanese Patent Application No. 2014-255810, filed Dec. 18, 2014. The contents of this application are incorporated herein by reference in their entirety.

BACKGROUND OF THE INVENTION

Field of the Invention

The present invention relates to an image forming apparatus which performs printing on a transfer medium based on image data, an image forming system, an image formation control method and an image forming method.

Description of the Related Art

As to an image forming apparatus and an image forming system, an apparatus has been proposed which, when a paper jam (JAM) occurs at a transfer medium being conveyed, enables processing (prepurge processing) for discharging sheets on an upstream side of a position where the paper jam occurs to a tray to which the sheets can be discharged. Because sheets for normal job before image formation are not used even if printing is performed on the sheets because a paper discharge destination is changed and pages are skipped, it is preferable to output blank sheets so as not to waste toner. Further, if blank sheets are outputted, the sheets can be reused. Printing can be performed again on pages on which printing is not performed through JAM recovery.

Further, as to an image forming apparatus and a post-processing apparatus, an apparatus has been proposed which enables processing (output paper concentration adjustment processing) of reading patch concentration of a chart for gamma correction using a mounted concentration sensor, and performing gamma correction processing.

In the correction processing using the chart for gamma correction, upon paper feeding, for example, by notifying a post-processing apparatus side including a reading apparatus that the sheet is a sheet for a chart for correction, the post-processing apparatus side, or the like, specifies a sheet to be conveyed, performs reading using the concentration sensor and notifies a control side of the result. Further, through notification of the reading result and notification of paper discharge completion from the post-processing apparatus, or the like, the control side determines that reading has been normally performed.

However, when a paper jam occurs during correction processing, a blank sheet is conveyed without a chart for correction being printed through prepurge processing. Therefore, the reading apparatus cannot normally read concentration and reports an error, or an image is formed based on an abnormal value, which results in formation of an abnormal image. Further, if processing is performed without correction processing being performed in association with prepurge, the processing is inefficient, and, when an image is printed on a sheet, printing itself is wasted.

Japanese Patent Laid-Open No. 2011-126017 enables image correction using sheets remaining in the apparatus upon occurrence of a paper jam. However, it is not determined whether the remaining sheets are sheets for normal job or sheets for correction, and necessary correction processing for the sheets is not performed, which causes a problem, for example, processing of image correction is performed at unintended time or patches are formed on different types of sheets.

The present invention has been made in view of the above circumstances, and is intended to provide an image forming apparatus which enables reduction of generation of waste paper and efficient correction by continuing image correction in a transfer medium required for image correction, an image forming system, an image formation control method and an image forming method upon occurrence of a paper jam.

SUMMARY OF THE INVENTION

To achieve at least one of the abovementioned objects, an image forming apparatus reflecting one aspect of the present invention comprises an image forming unit configured to perform printing on a transfer medium based on image data, a conveying unit configured to convey the transfer medium, and a control unit configured to control the printing and the conveyance, and the control unit has a function of image formation correcting processing of performing correction of the image forming unit in response to a reading result of an image printed on the transfer medium, the control unit has a function of prepurge processing of, when a paper jam occurs during conveyance of the transfer medium, performing control to discharge a valid transfer medium located on a conveyance path on a downstream side of a position where the paper jam occurs to outside the conveyance path and discharge a transfer medium located on a conveyance path on an upstream side of the position where the paper jam occurs to outside the conveyance path, and when the paper jam occurs, and the transfer medium being conveyed includes a transfer medium for correction to be used for the image formation correcting processing, the control unit performs control to perform the prepurge processing and continue the image formation correcting processing.

In the image forming apparatus according to the abovementioned aspect, it is preferable that the control unit forms a patch image on the transfer medium upon the image formation correcting processing and performs gamma correction of the image forming unit according to a reading result of the patch image.

In the image forming apparatus according to the abovementioned aspect, it is preferable that, upon the prepurge processing, when the transfer medium is a transfer medium before image formation and is not a transfer medium for correction, the control unit discharges a blank transfer medium without an image being printed at the image forming unit.

In the image forming apparatus according to the abovementioned aspect, it is preferable that, after the control unit executes printing on the transfer media of a predetermined number required for the correction by newly feeding a transfer medium if the number of transfer media required for the correction is insufficient, the control unit stops the image formation.

In the image forming apparatus according to the abovementioned aspect, it is preferable that, when the paper jam occurs on an upstream side of an image reading apparatus, the control unit does not newly feed a transfer medium for performing printing on transfer media of a predetermined number required for the correction.

In the image forming apparatus according to the abovementioned aspect, it is preferable that, when the paper jam occurs on a downstream side of an image reading apparatus, the control unit stops the image formation after executing printing on all transfer media of a predetermined number required for the correction.

In the image forming apparatus according to the abovementioned aspect, it is preferable that, when the image formation correcting processing is continued, if the transfer medium before image formation is a transfer medium for correction, the control unit performs control to print an image for correction on the transfer medium for correction.

In the image forming apparatus according to the abovementioned aspect, it is preferable that, when the image formation correcting processing is continued, after the image is read, the control unit discharges the transfer medium for correction to a paper discharge destination different from a paper discharge destination to which the transfer medium is discharged upon the prepurge processing.

In the image forming apparatus according to the abovementioned aspect, it is preferable that, when the image formation correcting processing is continued, after the image is read, the control unit discharges the transfer medium for correction to a paper discharge destination which is the same as a paper discharge destination upon the prepurge processing if the transfer medium for correction cannot be discharged to a paper discharge destination different from a paper discharge destination to which the transfer medium is discharged upon the prepurge processing.

In the image forming apparatus according to the abovementioned aspect, it is preferable that, when a transfer medium at which the paper jam occurs is the transfer medium for correction, the control unit stops the image formation after executing printing on all transfer media of the predetermined number required for the correction including the transfer medium for correction.

In the image forming apparatus according to the abovementioned aspect, it is preferable that the control unit stops conveyance of transfer media after the prepurge processing.

In the image forming apparatus according to the abovementioned aspect, it is preferable that the control unit receives a reading result of an image and a paper jam result from a posterior post-processing apparatus connected to the image forming apparatus.

To achieve at least one of the abovementioned objects, an image forming system reflecting one aspect of the present invention comprises an image forming apparatus and a post-processing apparatus, includes an image forming unit configured to perform printing on a transfer medium based on image data, a conveying unit configured to convey the transfer medium, and a control unit configured to control the printing and the conveyance, and the control unit has a function of image formation correcting processing of performing correction of the image forming unit in response to a reading result of an image printed on the transfer medium, the control unit has a function of prepurge processing of, when a paper jam occurs during conveyance of a transfer medium, performing control to discharge a valid transfer medium located on a conveyance path on a downstream side of a position where the paper jam occurs to outside a conveyance path and discharge a transfer medium located on a conveyance path on an upstream side of the position where the paper jam occurs to outside the conveyance path, and when the paper jam occurs, and the transfer medium being conveyed includes a transfer medium for correction to be used for the image formation correcting processing, the control unit performs control to perform the prepurge processing and continue the correction processing.

To achieve at least one of the abovementioned objects, an image forming control method, reflecting one aspect of the present invention, performing control to perform printing on a transfer medium at an image forming unit and convey the transfer medium at a conveying unit, includes a step of image formation correcting processing of performing correction of the image forming unit in response to a reading result of an image printed on the transfer medium, a step of performing prepurge processing of, when a paper jam occurs during conveyance of the transfer medium, performing control to discharge a valid transfer medium located on a conveyance path on a downstream side of a position where the paper jam occurs to outside the conveyance path and discharge a transfer medium located on a conveyance path on an upstream side of the position where the paper jam occurs to outside the conveyance path, and a step of, when the paper jam occurs, and the transfer medium being conveyed includes a transfer medium for correction to be used for the image formation correcting processing, performing control to perform the prepurge processing and continue the correction processing.

To achieve at least one of the abovementioned objects, an image forming method reflecting one aspect of the present invention includes a step of performing correction of image formation in response to a reading result of an image printed on a transfer medium, a step of prepurge of, when a paper jam occurs during conveyance of the transfer medium, discharging a valid transfer medium located on a conveyance path on a downstream side of a position where the paper jam occurs to outside the conveyance path and discharging a transfer medium located on a conveyance path on an upstream side of the position where the paper jam occurs to outside the conveyance path, and a step of, when the paper jam occurs, and the transfer medium being conveyed includes a transfer medium for correction to be used for correction of image formation, performing processing of the prepurge and continuing correction processing of image formation, and upon correction of the image formation, a patch image is formed on the transfer medium, and gamma correction of image formation is performed according to a reading result of the patch image.

DETAILED DESCRIPTION OF THE PREFERRED EMBODIMENTS

An embodiment of the present invention will be described below based on the accompanying drawings.

Figure 1:
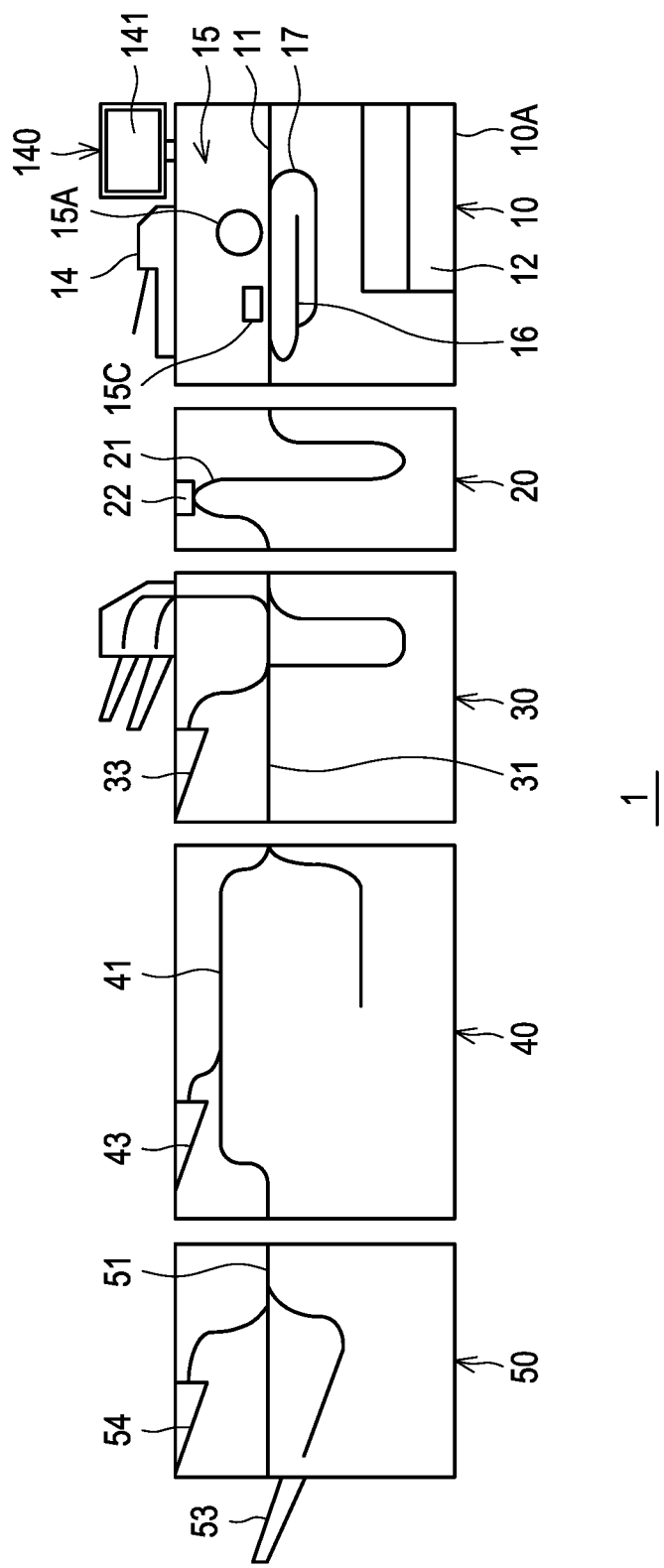
FIG. 1 is a schematic diagram illustrating mechanic configurations of an image forming apparatus and an image forming system according to one embodiment of the present invention.

FIG. 1 is a diagram schematically illustrating an image forming system 1 of the present invention. In the image forming system 1, from an anterior stage side to a posterior stage side, an image forming apparatus 10, a first post-processing apparatus 20, a second post-processing apparatus 30, a third post-processing apparatus 40 and a fourth post-processing apparatus 50 are mechanically and electrically connected in this order so as to be able to perform communication with each other. A conveyance path 21 of the first post-processing apparatus 20, a conveyance path 31 of the second post-processing apparatus 30, a conveyance path 41 of the third post-processing apparatus 40, and a conveyance path of the fourth post-processing apparatus 50 are connected in this order. Further, the second post-processing apparatus 30 includes a paper discharge tray as a paper discharge destination, the third post-processing apparatus 40 includes a paper discharge tray 43 as a paper discharge destination, and the fourth post-processing apparatus 50 includes paper discharge trays 53 and 54 as paper discharge destinations.

Each post-processing apparatus has an appropriate post-processing function such as relay, alignment, stapling, punching, cutting, folding and forming of a booklet, and one post-processing apparatus can have a plurality of post-processing functions. It should be noted that functions of each post-processing apparatus are not particularly limited, and the number of functions of each post-processing apparatus is not particularly limited.

In the present embodiment, an image reading unit 22 which reads an image on a sheet is provided on the conveyance path 21 of the first post-processing apparatus 20. The position where the image reading unit is provided is not particularly limited, and can be provided at any position if the position is on a downstream side of the image forming unit on the conveyance path. Further, it is also possible to provide an image reading apparatus within the image forming apparatus 10. While the image reading unit 22 is, for example, configured with a line sensor, or the like, the configuration is not particularly limited, and any configuration can be employed if an image can be read. In the present embodiment, the image reading unit 22 corresponds to an image reading apparatus of the present invention.

Outline of the image forming apparatus 10 will be described.

In the image forming apparatus 10, a document feeding apparatus (DF) 14 which constitutes part of a document reading unit is provided on an upstream side of an image forming apparatus body 10A, and an image on a document fed by the document feeding apparatus (DF) 14 can be read at a scanner unit which is not illustrated. It should be noted that the document can be also read on a platen glass which is not illustrated.

Further, an operating unit 140 is provided at a position where the platen glass is not located at an upper side of the image forming apparatus body 10A, and an LCD 141 is provided at the operating unit 140. The LCD 141 is configured with a touch panel so as to allow operation by an operator and display of information. The LCD 141 is used by both the operating unit and the display unit. It should be noted that it is also possible to configure the operating unit with a mouse, a tablet, or the like, separately from the display unit. Further, it is also possible to configure the LCD 141 so as to be able to move.

At a lower side of the image forming apparatus body 10A, a plurality of paper feed trays 12 (two stages in the figure) are disposed, so that sheets can be stored and fed. The sheet corresponds to a transfer medium of the present invention. The type of the transfer medium is not particularly limited. It should be noted that, while not illustrated, a large capacity paper feed tray can be connected on an upstream side of the image forming apparatus 10.

A conveyance path 11 which conveys a sheet fed from any of the paper feed trays 12 is provided within the image forming apparatus body 10A, and an image forming unit 15 is provided in the course of the conveyance path 11. The image forming unit 15 has a photoreceptor 15A, and a charger, a developer, a transferring unit and an LD 15B (illustrated in FIG. 2), which are not illustrated, around the photoreceptor 15A, and, further, a fixing unit 15C is disposed on the conveyance path 11 on a downstream side of the photoreceptor 15A.

The conveyance path 11 branches on a downstream side of the fixing unit 15C, and a reversing conveyance path having a reversing conveyance apparatus 16 is connected.

In the image forming unit 15, a surface of the photoreceptor 15A is uniformly charged by the charger before an image is written, and an electrostatic latent image is formed on the photoreceptor 15A whose surface is uniformly charged by the LD 15B radiating a semiconductor laser. The developer develops the electrostatic latent image formed on the photoreceptor 15A by the LD 15B using a toner member. Through this development processing, a toner image is formed on the photoreceptor 15A. The transferring unit transfers the toner image on the photoreceptor 15A to a sheet conveyed from the paper feed tray 12 or the large capacity paper feed tray which is not illustrated. The sheet to which the toner image is transferred is separated from the photoreceptor 15A and conveyed to the fixing unit 15C. The toner member remaining on the photoreceptor 15A is removed by a cleaning unit which is not illustrated.

The fixing unit 15C fixes the toner image transferred on a surface side of the sheet as an output image by heating the conveyed sheet. The sheet subjected to fixing processing is conveyed as is to the first post-processing apparatus 20 through the conveyance path 11, or after the sheet is sent to a reversing conveyance path 17 and reversed by the reversing conveyance apparatus 16, the sheet is circulated to an upstream side of the image forming unit 15, and an image is formed on a back side of the reversed sheet by the image forming unit 15, so that printing can be performed on both sides. It should be noted that it is also possible to return the sheet to the conveyance path 11 without sending the sheet to the image forming unit 15 after sending the sheet to the reversing conveyance path 17 and reversing the sheet at the reversing conveyance apparatus 16.

The conveyance path 11 is connected to the conveyance path 21 of the first post-processing apparatus 20 on a downstream side.

Figure 2:
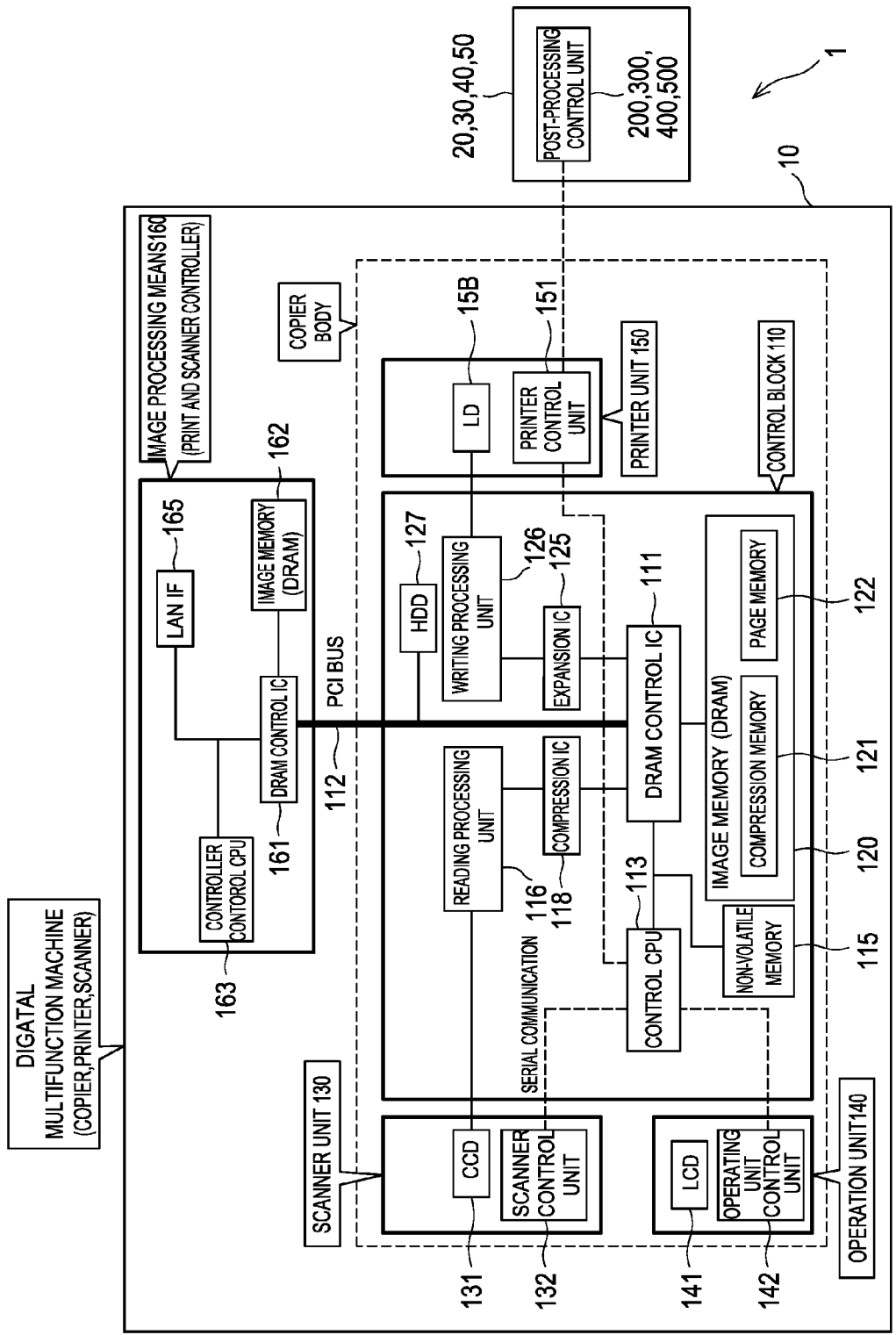
FIG. 2 is a diagram illustrating control blocks of the image forming apparatus and the image forming system according to one embodiment of the present invention.

Next, FIG. 2 is a block diagram illustrating electrical configurations of the image forming apparatus and the image forming system of the present embodiment, which will be described below.

The image forming system 1 includes, as main components, a copier body having a control block 110, a scanner unit 130, an operating unit 140 and a printer unit 150, and an image processing unit (print and scanner controller) 160 which processes image data inputted from and outputted to external equipment (for example, a PC or a server) through a LAN.

The control block 110 has a PCI bus 112, and the PCI bus 112 is connected to a DRAM control IC 111 within the control block 110. Further, the control block 110 includes a control CPU 113, and the DRAM control IC 111 is connected to the control CPU 113. Further, a non-volatile memory 115 is connected to the control CPU 113. In the non-volatile memory 115, a program for operating the above-described control CPU 113, setting data of the image forming apparatus, a process control parameter, data of a patch image for correction, or the like, are stored.

The control CPU 113 which includes a RAM and a ROM, controls the whole image forming system 1, recognizes a state of the whole image forming apparatus, and performs control of conveyance of a transfer medium, image formation, or the like. That is, the control CPU 113 serves as part of a control unit of the present invention, and constitutes the control unit of the present invention along with a control program running on the control CPU 113. The control program is stored in the ROM, the non-volatile memory 115, or the like. It should be noted that, while, in the present embodiment, description has been provided such that the control CPU 113 is provided within a chassis of the image forming apparatus body 10A, it is also possible to provide part or all functions of the control CPU 113 outside the chassis of the image forming apparatus body 10A.

It should be noted that when a paper jam of the transfer medium occurs within the image forming apparatus body 10A or each post-processing apparatus, the control CPU 113 is notified of occurrence of the paper jam. In each post-processing apparatus, when a paper jam occurs, a post-processing control unit notifies the control CPU 113 of the paper jam directly or via other post-processing control units. A sensor detecting the transfer medium is provided in each post-processing apparatus, and when arrival of a transfer medium conveyed on the conveyance path is delayed with respect to this sensor, it is possible to determine that a paper jam occurs. It is possible to determine a position where the paper jam occurs by arrangement of a plurality of sensors and a detection result of each sensor, and each post-processing control unit notifies the control CPU 113 of the position where the paper jam occurs along with occurrence of the paper jam.

When a paper jam occurs, the control CPU 113 discharges a sheet which is located on a downstream side of a position where the paper jam occurs, and on which an image has been formed, as a valid sheet to, for example, a paper discharge tray 53 of the fourth post-processing apparatus 50 through a discharge path and discharges a transfer medium located on the conveyance path on an upstream side of the position where the paper jam occurs to a designated paper discharge destination located on an upstream side of the position where the paper jam occurs, for example, the paper discharge trays 54. At this time, a transfer medium on which an image has not been formed is discharged as a blank sheet without an image being printed. This processing is prepurge processing function. The prepurge processing can be automatically executed by the control CPU 113 when a paper jam occurs, or can be executed through operation by a user. Whether or not to execute the prepurge processing can be set through the operating unit 140.

Further, the control CPU 113 has an image correction processing function of maintaining quality of an image by forming a patch image on a transfer medium for each of a predetermined time period during which the image forming apparatus operates or for each of the predetermined number of printed sheets, reading the patch image by the image reading unit 22, or the like, to compare a state of the image (image quality parameters such as color tone, concentration balance and a line width) with image formation conditions, determining whether an image is properly formed and calibrating the image formation conditions. The image correction processing is executed by the set conditions such as for each of a predetermined time period and for each of the predetermined number of printed sheets. These conditions can be set or changed by the user through the operating unit 140, or start conditions can be set by initial setting. The correction can be performed using a charging bias of a charging apparatus, an exposure light amount and an exposure position of an exposure apparatus, a developing bias of a developing apparatus, concentration correction characteristics, or the like. In the present invention, correction content of the image formation is not particularly limited. As one example, a correction curve for output concentration adjustment is prepared which associates tone concentration of the image data with tone concentration of an output and adapting the image data to output tone characteristics of each apparatus to maintain a fixed level of image quality, and printer gamma correction for adjusting the image formation conditions is performed based on this correction curve.

The scanner unit 130 includes a CCD 131 which performs optical reading, and a scanner control unit 132 which controls the whole scanner unit 130. The scanner control unit 132 is connected to the control CPU 113 so as to be able to perform serial communication, and is controlled by the control CPU 113. It should be noted that the scanner control unit 132 can be configured with a CPU and a program, or the like, which operates the CPU. The image data read by the CCD 131 is subjected to data processing at the reading processing unit 116.

The operating unit 140 includes a touch panel type LCD 141 and an operating unit control unit 142, the LCD 141 is connected to the operating unit control unit 142, and the operating unit control unit 142 is connected to the control CPU 113 so as to be able to perform serial communication. This configuration enables control of the operating unit 140 by the control CPU 113. It should be noted that the operating unit control unit 142 can be configured with a CPU and a program, or the like, which operates the CPU. The operating unit 140 which allows input of setting of the image forming apparatus and the image forming system, and operation control conditions such as an operation instruction, and which further allows display of set content, a machine state and information, is controlled by the control CPU 113. The operating unit 140 enables predetermined operation, or the like.

For example, it is possible to set a timing, or the like, of image formation correction through the operating unit 140.

Further, the operating unit 140 can be used as means for setting a sheet size to be used for printing. The control CPU 113 can perform paper feeding control according to set content of the operating unit 140.

Further, the DRAM control IC 111 is connected to an image memory (DRAM) 120 which is comprised of a compression memory 121 and a page memory 122. In the image memory (DRAM) 120, image data acquired by the scanner unit 130 and image data acquired through the LAN are stored. As described above, the image memory is a storage region of image data, and image data of a job to be printed is stored. Further, it is possible to store image data relating to a plurality of jobs in the image memory by the DRAM control IC 111. That is, it is also possible to store image data of a reserved job in the image memory.

Further, an HDD 127 is connected to the PCI bus 112, and various kinds of data can be stored and read out.

A compression IC 118 which compresses image data and an expansion IC 125 which expands the compressed image data are connected to the DRAM control IC 111. A writing processing unit 126 is connected to the expansion IC 125. The writing processing unit 126 which is connected to the LD 15B of the printer unit 150, performs processing of data to be used for operation of the LD 15B. Further, the printer unit 150 includes a printer control unit 151 which controls the whole printer unit 150, and the printer control unit 151 is connected to and controlled by the control CPU 113. That is, the printer control unit 151 starts/stops printing operation according to a parameter provided from the control IC 113.

The printer unit 150 includes the image forming unit 15, the conveying unit, or the like, and operation the printer unit 150 is controlled by the control CPU 113. The conveying unit is configured with a conveyance path 11, a roller which feeds a sheet, a driving unit such as a motor which rotates the roller, or the like. Further, the conveying units of the first post-processing apparatus 20, the second post-processing apparatus 30, the third post-processing apparatus 40 and the fourth post-processing apparatus 50 are controlled by the control CPU 113.

Further, control units of the post-processing apparatuses are connected to the printer control unit 151 so as to be able to perform control.

Specifically, a post-processing control unit 200 of the first post-processing apparatus 20 is connected to the printer control unit 151, a post-processing control unit 300 of the second post-processing apparatus 30 is connected to the post-processing control unit 200, a post-processing control unit 400 of the third post-processing apparatus 40 is connected to the post-processing control unit 300, and a post-processing control unit 500 of the fourth post-processing apparatus 50 is connected to the post-processing control unit 400. Each of the post-processing control units 200, 300, 400 and 500 controls conveyance of a transfer medium or execution of post-processing in each post-processing apparatus according to an instruction from the control CPU 113. The post-processing control units 200, 300, 400 and 500 can be provided within the image forming apparatus body 10A or can be respectively provided at the post-processing apparatuses.

Further, a DRAM control IC 161 of the image processing unit (print and scanner controller) 160 described above is connected to the PCI bus 112 connected to the DRAM control IC 111. In the image processing unit (print and scanner controller) 160, the image memory 162 is connected to the DRAM control IC 161. Further, in the image processing unit (print and scanner controller) 160, a controller control CPU 163 is connected to the DRAM control IC 161, and a LAN interface 165 is connected to the DRAM control IC 161. The LAN interface 165 is connected to a LAN which is not illustrated.

External equipment is connected to the LAN, and the image forming system can be configured by a configuration including the external equipment. The external equipment can have a function of a control unit which controls the image forming system.

Basic operation of the image forming system 1 will be described next.

First, procedure of accumulating image data in the image forming apparatus body 10A will be described.

When an image on a document is read at the scanner unit 130 to generate image data, the scanner unit 130 optically reads the image on the document from the document using a CCD 131. At this time, the operation of the CCD 131 is controlled by the scanner control unit 132 which receives an instruction from the control CPU 113. The image read using the CCD 131 is subjected to data processing at the reading processing unit 116, and the image data subjected to data processing is compressed using a predetermined method at the compression IC 118, and stored in the compression memory 121 via the DRAM control IC 111. The image data stored in the compression memory 121 can be managed by the control CPU 113 as a job. Further, after the image data is stored in the image memory (DRAM) 120, the image data can be stored in the HDD 127.

Printing conditions, or the like, can be set at the operating unit 140. For example, the control CPU 113 is notified of information such as printing conditions (print mode) set on the operating unit 140, and the control CPU 113 creates setting information. The created setting information is stored in a RAM within the control CPU 113. Designation of image correction, normal printing, or the like, can be performed by the operating unit 140.

When image data is acquired from outside, for example, image data transmitted from external equipment through the LAN is stored in the image memory 162 by the DRAM control IC 161 via the LAN interface 165 under control of the controller control CPU 163. The data in the image memory 162 is once stored in the page memory 122 via the DRAM control IC 161, the PCI bus 112 and the DRAM control IC 111. The data stored in the page memory 122 is sequentially sent to the compression IC 118 via the DRAM control IC 111, subjected to compression processing, stored in the compression memory 121 via the DRAM control IC 111, and managed by the control CPU 113 in a similar manner as described above. Further, the image data stored in the compression memory 121 can be stored in the HDD 127 via the DRAM control IC 111.

When the image forming apparatus outputs an image, that is, when the image forming apparatus is used as a copier or a printer, the image data stored in the compression memory 121 is sent to the expansion IC 125 via the DRAM control IC 111 and expanded, and the expanded data is sent to the writing processing unit 126 and written on each photoreceptor at the LD 15B.

Further, when the image data is stored in the HDD 127, the image data is once stored in the compression memory 121 via the DRAM control IC 111, and thereafter subjected to the same processing as described above.

When an image is output, while it is possible to output the image based on the set content of the operating unit 140 as described above, it is also possible to receive control content from external equipment, or the like, for example, receive control content such as printing conditions based on a printer driver within the external equipment. The printing conditions, or the like, are stored in the image memory 162 by the DRAM control IC 161 via the LAN interface 165 in a similar manner to the image data. The data in the image memory 162 is stored in the page memory 122 via the DRAM control IC 161, the PCI bus 112 and the DRAM control IC 111.

Further, at the printer unit 150, each unit is controlled by the printer control unit 151 which receives an instruction from the control CPU 113. At the image forming unit 15, a toner image written on the photoreceptor 15A is transferred to a sheet supplied by the conveyance path 11 and fixed at the fixing unit 15C. The sheet on which the image is formed is conveyed to the first post-processing apparatus 20 by the conveyance path by way of the fixing unit, conveyed to the second post-processing apparatus 30, the third post-processing apparatus 40, and the fourth post-processing apparatus 50 as necessary, and subjected to post-processing set in the printing conditions. When there is no setting for post-processing, the sheet is discharged to any paper discharge destination without being subjected to post-processing.

It should be noted that while in the above description, there is one photoreceptor 15A, the image forming apparatus can have a plurality of photoreceptors 15A and can be able to perform printing of a plurality of colors through an intermediate transfer belt, or the like.

Operation when a paper jam occurs will be described next using FIG. 3(A) and FIG. 3(B).

Figure 3A:
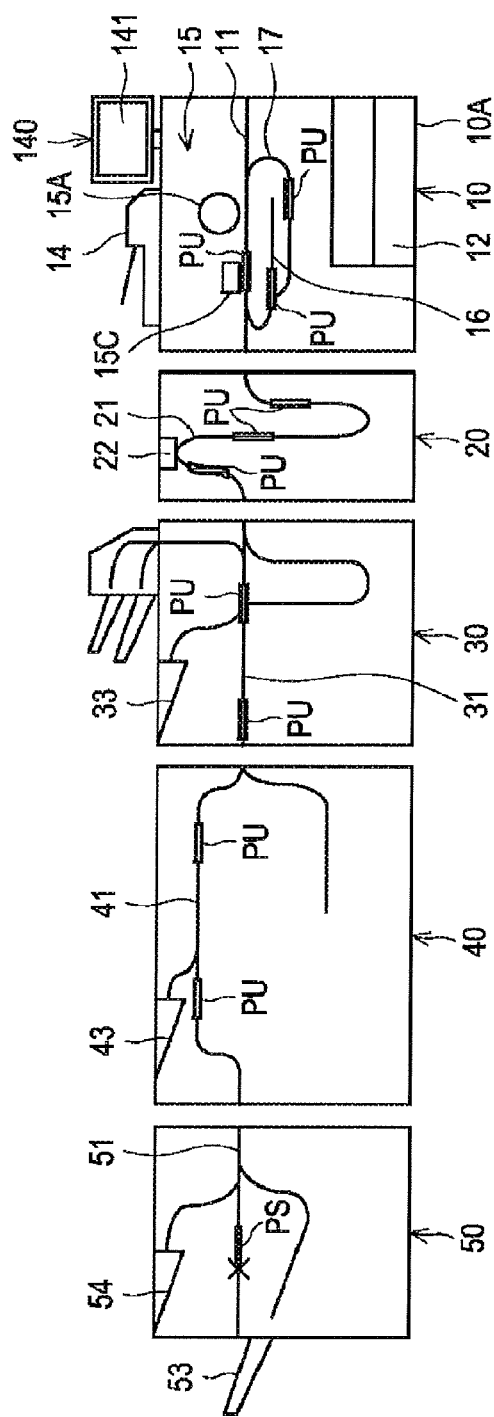
FIG. 3(A) is a diagram illustrating a state where a paper jam occurs in the image forming system.
Figure 3B:
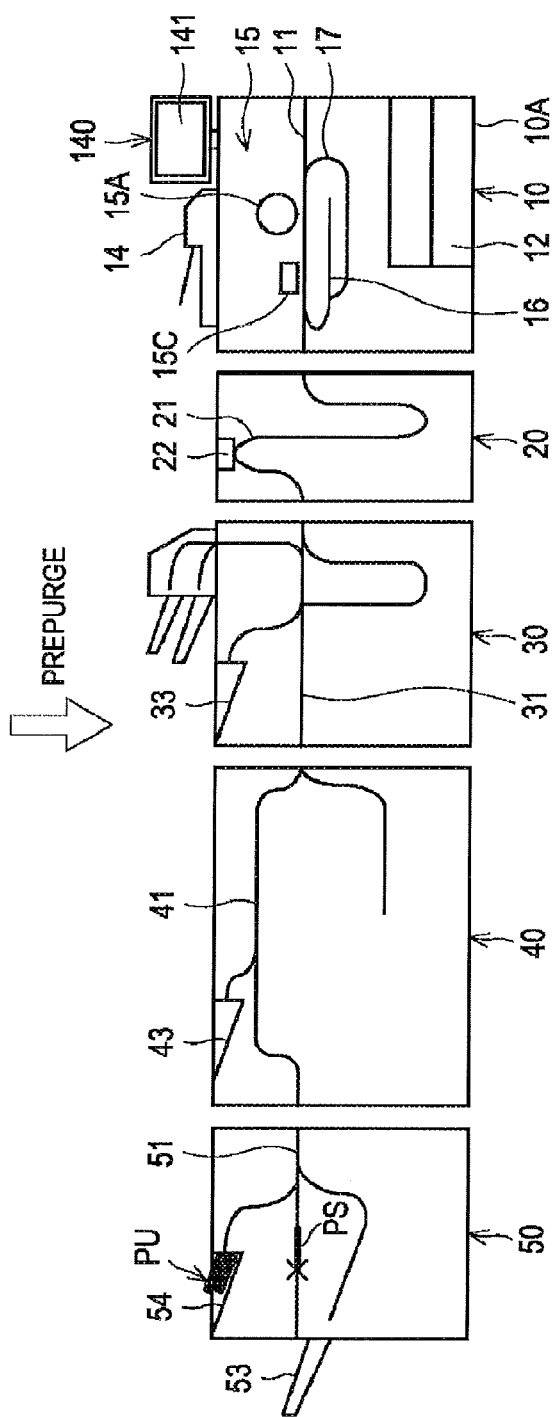
FIG. 3(B) is a diagram for explaining prepurge processing according to one embodiment of the present invention.

FIG. 3(A) illustrates the image forming system 1 in which a paper jam occurs, and the paper jam occurs on the conveyance path 51 of the fourth post-processing apparatus 50, on a downstream side of a point which leads to the paper discharge tray 54 from the conveyance path 51. The control CPU 113 is notified of occurrence of the paper jam, the point where the paper jam occurs, and whether or not it is possible to perform prepurge, from the post-processing control unit 500. Further, at the time at which the paper jam occurs, there are sheets being conveyed respectively at the image forming apparatus 10, the first post-processing apparatus 20, the second post-processing apparatus 30 and the third post-processing apparatus 40. A sheet PS which is an origin of the paper jam and sheets PU located on an upstream side of the sheet PS correspond to sheets for normal job in the present embodiment. The types of sheets (for normal job or for adjustment) are recognized at the control CPU 113, and each post-processing apparatus is notified of the type of sheet based on sheet information of each transfer medium.

The control CPU 113 performs prepurge processing in association with occurrence of the paper jam. In the prepurge processing, the paper discharge tray 54 which is different from the paper discharge tray 53 to which a valid sheet is discharged, and which branches from an upstream side of the point where the paper jam occurs, is designated, and sheets are discharged. In FIG. 3(A), because there is no valid sheet being conveyed at the time at which the paper jam occurs, as illustrated in FIG. 3(B), all the sheets PU are discharged to the paper discharge tray 54. Further, a sheet which is located inside the image forming apparatus 10 and on which an image is not formed is discharged in a similar manner to the paper discharge tray 54 as a blank sheet without an image being formed. It should be noted that a sheet on which an image is printed on one side and an image is to be printed on the other side is discharged without an image being formed on the other side.

Figure 4:
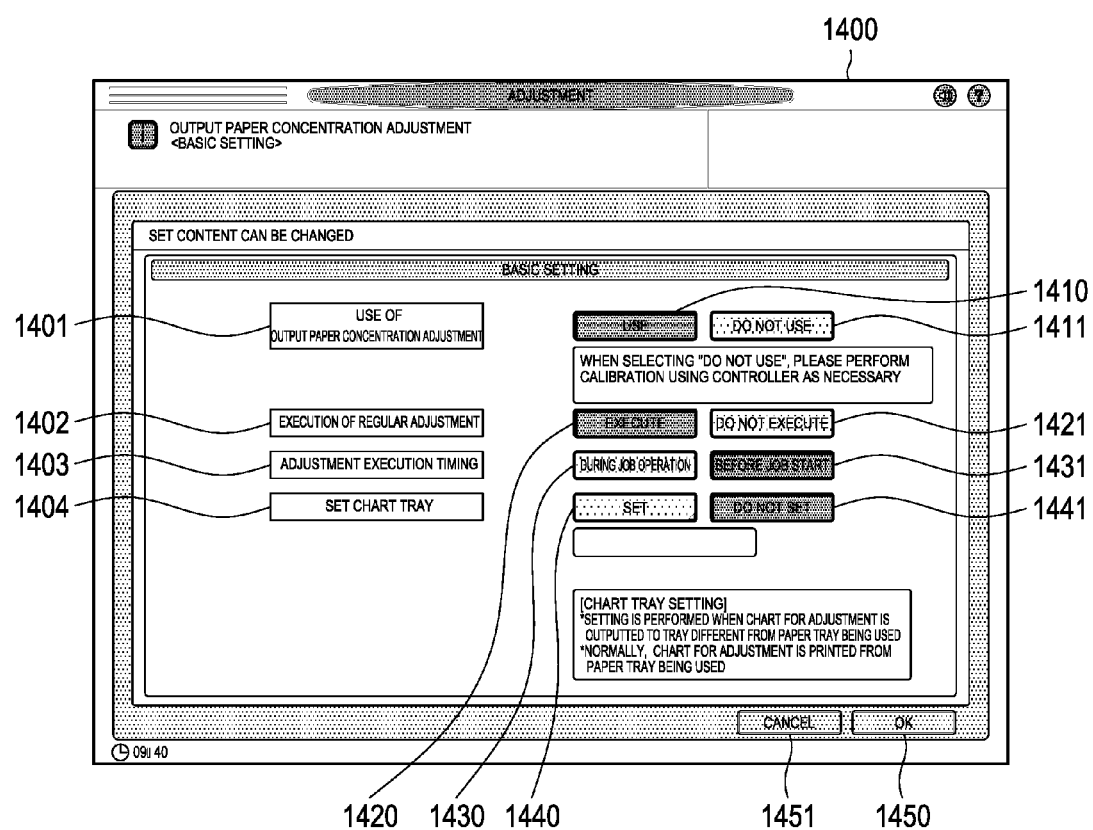
FIG. 4 is a diagram illustrating an output concentration adjustment screen displayed on an operating unit according to one embodiment of the present invention.

FIG. 4 illustrates an example of a screen through which output paper concentration adjustment setting is performed as image formation correction.

An output paper concentration adjustment setting screen 1400 is displayed on the LCD 141 so as to be able to be operated. The user can select and display the output paper concentration adjustment setting screen 1400 among setting screens.

The output paper concentration adjustment setting screen 1400 has a field 1401 as to use of output paper concentration adjustment, a field 1402 as to execution of regular adjustment, an adjustment execution timing field 1403 and a chart tray setting field 1404.

In the field 1401 as to use of output paper concentration adjustment, a "use" button 1410 and a "do not use" button 1411 are displayed so as to be able to be depressed. If the "use" button 1410 is selected, output paper concentration adjustment is performed automatically or as required by the user. If the "do not use" button 1411 is selected, output paper concentration adjustment is not performed, and the following button operation does not become valid. It is also possible to employ a configuration where either button is selected through initial setting, or the like, and the user can change the setting as appropriate. In "do not use" setting, the user can perform calibration as necessary through setting items of machine setting, or the like.

In the field 1402 as to execution of regular adjustment, an "execute" button 1420 and a "do not execute" button 1421 are displayed so as to be able to be depressed. If the "execute" button 1420 is selected, regular adjustment is executed. Content of regular adjustment can be determined in advance through initial setting or a setting value can be designed to be able to be set by the user. The regular adjustment can be performed for each of a predetermined time period or for each of the number of printed sheets. If the "do not execute" button 1421 is selected, regular adjustment is not performed. In the "do not execute" setting, the user does not perform output paper concentration adjustment as necessary. It is also possible to employ a configuration where either button is selected through initial setting, or the like, and the user can change the setting as appropriate.

In the adjustment execution timing field 1403, a "during job operation" button 1430 and a "before job start" button 1431 are displayed so as to be able to be depressed. If the "during job operation" button 1430 is selected, output concentration adjustment is performed by regular adjustment or user instruction operation during operation of a job. If the "before job start" button 1431 is set, even if regular adjustment or user instruction operation is set, output paper concentration adjustment is executed before a job starts.

In the chart tray setting field 1404, a "set" button 1440 and a "do not set" button 1441 are displayed so as to be able to be depressed. If the "set" button 1440 is selected, a chart tray to which a transfer medium for correction is fed is set. A tray can be determined as the chart tray in advance through initial setting, or the user can be able to determine the chart tray. This button is used when a tray different from a paper tray being used is used for output as a tray for correction. If the "do not set" button 1441 is selected, a chart for correction is fed from the paper tray being used.

Further, in the output paper concentration adjustment setting screen 1400, an "OK" button 1450 and a "cancel" button 1451 are displayed so as to be able to be depressed. When the "OK" button 1450 is selected, the set matters are settled, while, when the "cancel" button 1451 is selected, the matters set on the current screen is cancelled, and the setting returns to a state before setting.

Figure 5:
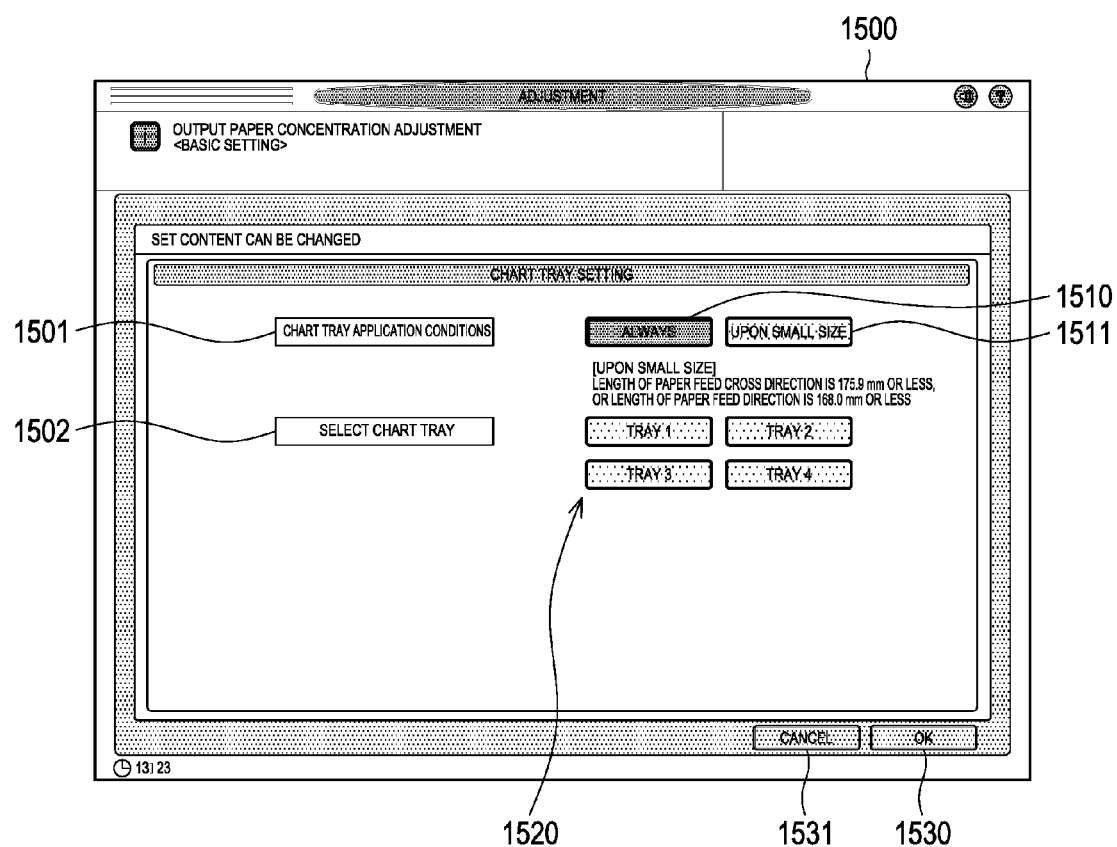
FIG. 5 is a diagram illustrating a chart tray setting screen displayed on the operating unit upon output concentration adjustment according to one embodiment of the present invention.

FIG. 5 illustrates a chart setting screen 1500 displayed when the "set" button 1440 is selected on the output paper concentration adjustment setting screen 1400.

In the chart setting screen 1500, a chart tray application conditions field 1501 and a chart tray selection field 1502 are displayed.

In the chart tray application conditions field 1501, an "always" button 1510 and an "upon small size" button 1511 are displayed so as to be able to be depressed. When the "always" button 1510 is selected, the set tray is always used for correction. When the "upon small size" button 1511 is selected, the set chart tray is used only when a normal job uses a transfer medium of a small size. Whether or not a size of the transfer medium is small can be determined in advance through initial setting. In the present embodiment, a length of a paper feed cross direction is 175.9 mm or less, or a length of a paper feed direction is 168.0 mm or less, and if either conditions are satisfied, the control unit determines that the size of the transfer medium is small. It should be noted that it is also possible to employ a configuration where a value for determining that the size of the transfer medium is small can be set by the user.

In the chart tray selection field 1502, a selected tray is designated. In the figure, tray buttons 1520 which can be depressed for each tray are displayed, and a chart tray is determined by any of the tray buttons being depressed.

In the chart setting screen 1500, an "OK" button 1530 and a "cancel" button 1531 are displayed so as to be able to be depressed. When the "OK" button is selected, the set matters are settled, while, when the "cancel" button 1531 is selected, the matters set on the current screen are cancelled, and setting returns to a state before the setting.

Figure 6:
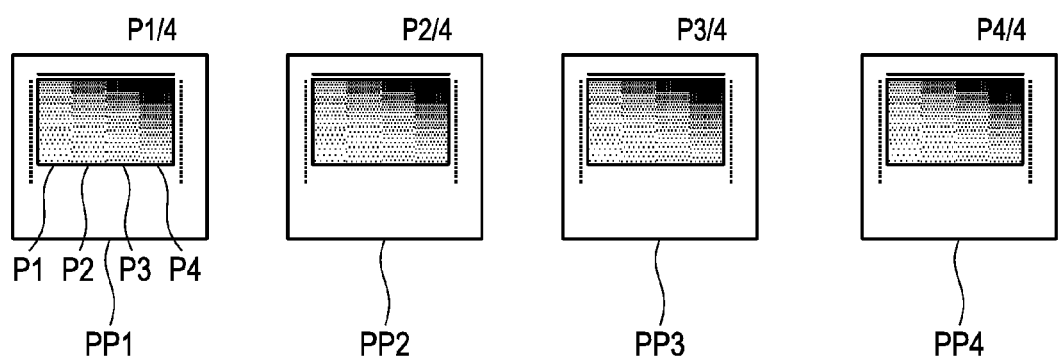
FIG. 6 is a diagram illustrating patch images on sheets according to one embodiment of the present invention.

FIG. 6 illustrates sheets PP1 to PP4 (collectively referred to as "PP") for adjustment on which output paper concentration correction charts are printed. The size of the sheets PP1 to PP4 is a medium size, and, for example, A4 is selected. Patch images P1 to P4 for respective colors are printed on each sheet PP while concentration is changed. Colors of the patch images can include, for example, yellow (P1), magenta (P2), cyan (P3) and black (P4). In FIG. 6, concentration becomes lower toward a lower part from an upper part in the figure, and the number of sheets for correction is set at four. It should be noted that, in the present embodiment, a sheet for adjustment corresponds to a transfer medium for correction of the present invention.

Here, a case will be described where a paper jam occurs, and, at this time, sheets being conveyed include a sheet for adjustment. A state of sheets being conveyed is illustrated in FIG. 7.

In this example, in the fourth post-processing apparatus 50, a sheet PS which is an origin of the paper jam exists on the conveyance path 51 on a downstream side of a point where the path to the paper discharge tray 54 branches. Upon occurrence of the paper jam, sheets PU for normal job exist within the second post-processing apparatus 30 and the third post-processing apparatus 40. Sheets PU for normal job exist on a downstream side of the image reading unit 22, and a sheet PP for correction exists on an upstream side of the image reading unit 22 within the first post-processing apparatus 20, and, a sheet PP for adjustment exists within the image forming apparatus 10.

When a paper jam occurs, the control CPU 113 is notified of occurrence of the paper jam and an occurrence point. In the present embodiment, the control CPU 113 is notified through the post-processing control unit 500. The control CPU 113 determines whether sheets being conveyed include a sheet for adjustment, and, when a sheet for adjustment is included, a sheet for normal job is prepurged, and a sheet for adjustment is continued to be subjected to image formation correcting processing, and discharged. It should be noted that, although not illustrated, when a valid sheet exists on a downstream side of a position where the paper jam occurs, the valid sheet is discharged to the normal paper discharge tray 53.

Figure 7:
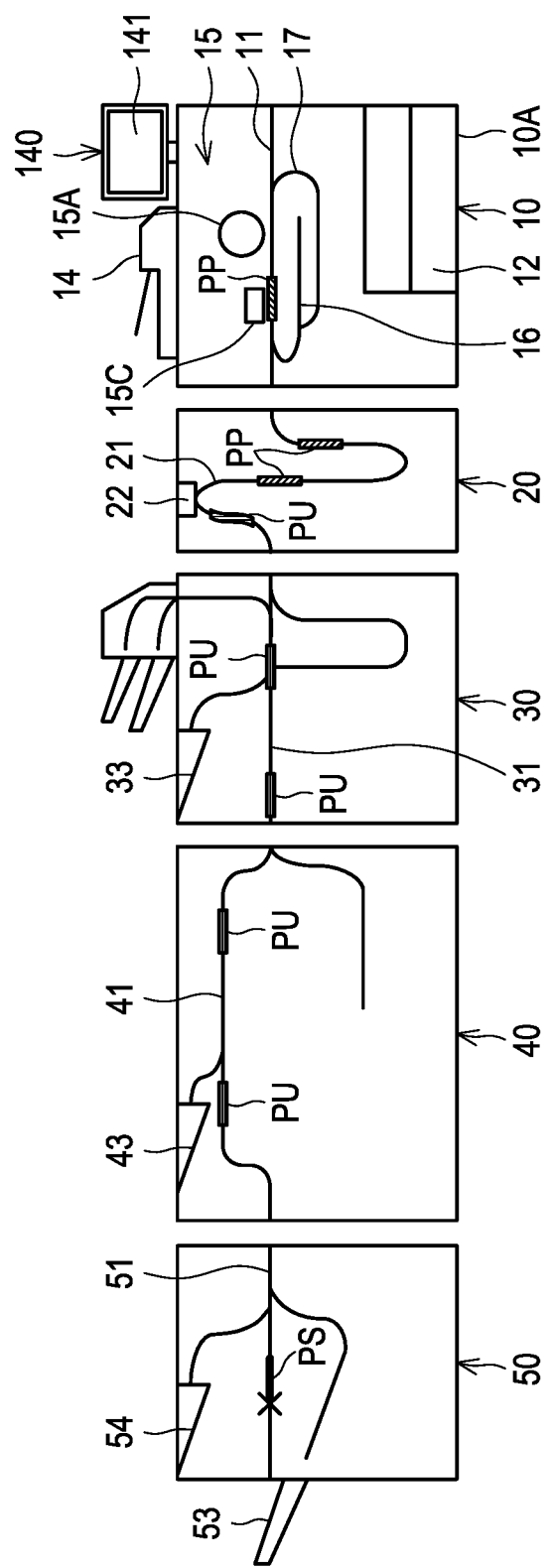
FIG. 7 is a diagram illustrating the image forming system when a sheet for output concentration adjustment is included upon occurrence of a paper jam according to one embodiment of the present invention.
Figure 8:
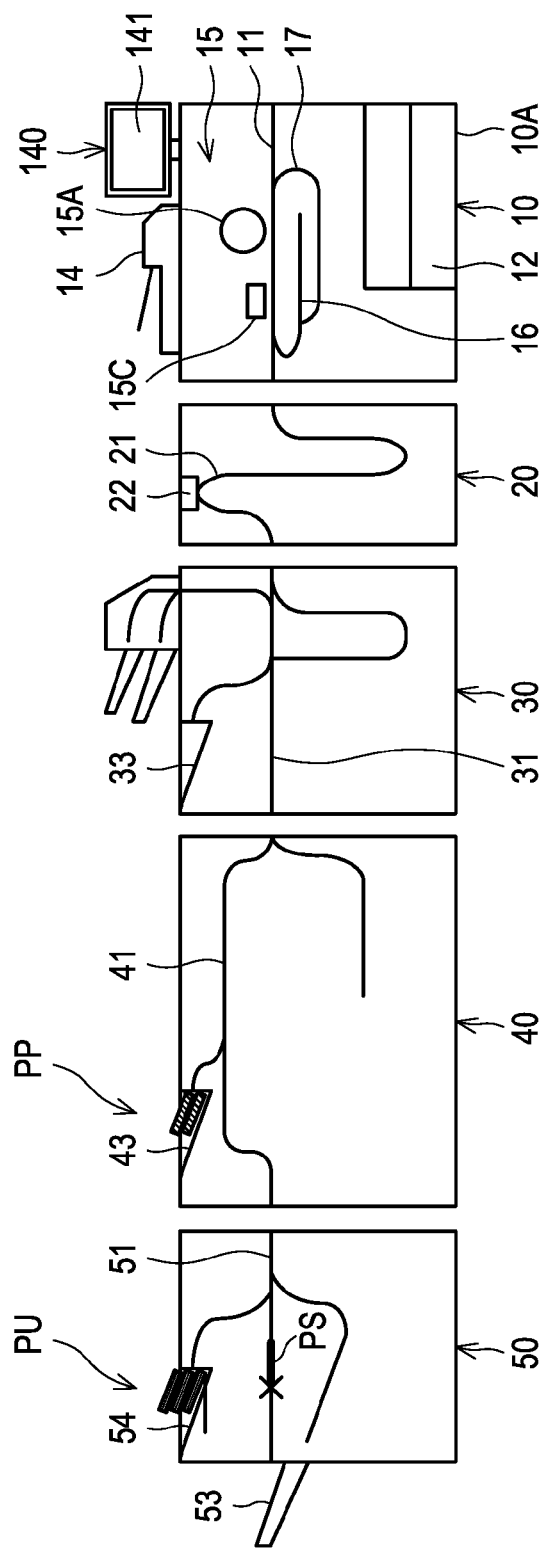
FIG. 8 is a diagram illustrating the image forming system in a state where prepurge is performed when the sheet for output concentration adjustment is included upon occurrence of the paper jam according to one embodiment of the present invention.

FIG. 8 illustrates a state where the prepurge processing is performed and the correction processing is continued in a state where the paper jam occurs as illustrated in FIG. 7. That is, the sheets PU are discharged to the paper discharge tray 54 which is located at a point on an upstream side of the position where the paper jam occurs through prepurge. Meanwhile, an image on the sheet PP is read by the image reading unit 22 during conveyance. The read image is transmitted to the control CPU 113, and the control CPU 113 performs adjustment processing of the image forming unit as necessary based on the received image data. The read sheet PP is discharged to the paper discharge tray 43 which is different from the paper discharge tray 54. By this means, it is possible to easily distinguish invalid sheets for normal job from a sheet for adjustment.

It should be noted that, while in the above description, description has been provided assuming that a patch image is formed on the sheet PP for adjustment, there is a case where a sheet for adjustment before printing remains within the image forming apparatus 10.

Figure 9:
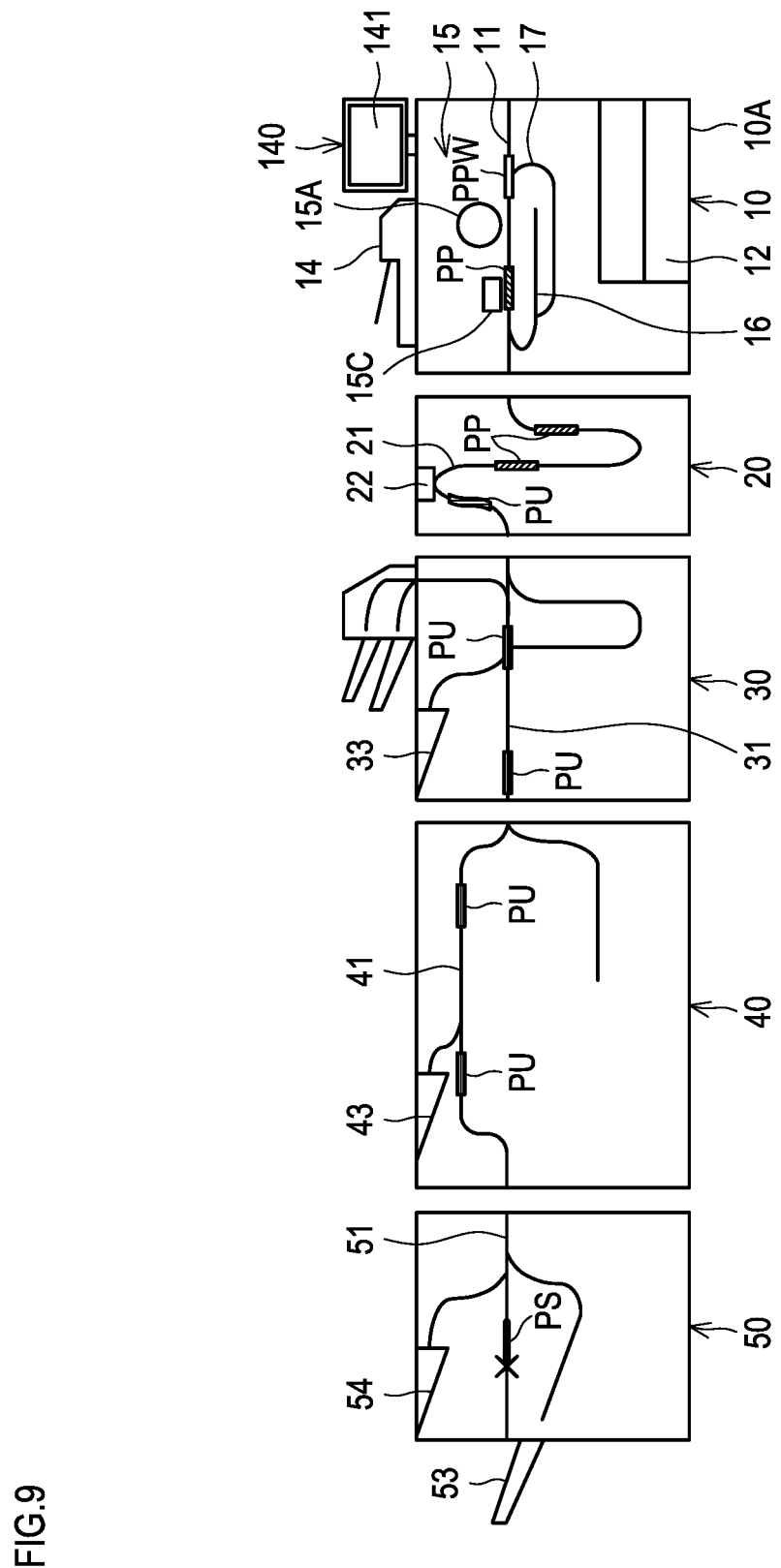
FIG. 9 is a diagram illustrating the image forming system when a sheet for output concentration adjustment and a sheet on which printing is not performed are included upon occurrence of the paper jam according to one embodiment of the present invention.

FIG. 9 illustrates a state where a sheet PPW for correction on which printing is not performed remains within the image forming apparatus 10.

In this paper jam state, the sheets PU for normal job are discharged to the paper discharge tray 43 as with the above description. Further, an image on the sheet PP for adjustment on which a patch image is formed is read by the image reading unit 22 and used for adjustment in the image forming unit 15, and the sheet PP for adjustment is discharged to the paper discharge tray 43 as with the above description. Still further, a necessary patch image is printed on the sheet PPW for adjustment before printing at the image forming unit 15, and an image on the sheet PPW for adjustment is read at the image reading unit 22 and used for adjustment in the image forming unit 15, and the sheet PPW for adjustment is discharged to the paper discharge tray 43 as with the sheet PP. It should be noted that, when the number of sheets is insufficient for adjustment, it is also possible to newly feed a sheet from a tray so that the number of sheets reaches the number of sheets required for adjustment, form an image, read the image, and discharge the sheet to the paper discharge tray 43.

Further, in the image forming apparatus 10, printing is not performed on a sheet for normal job before printing, or on a sheet for normal job on which printing is performed on only one side although printing is to be performed on both sides, and the sheet is discharged to the paper discharge tray 54. For the normal job, a sheet is not newly fed. However, the present invention is not limited to this, and it is also possible to newly feed sheets of the number required for the normal job.

When printing on a predetermined required number of sheets for adjustment is completed, it is possible to stop image formation. After sheets are discharged to paper discharge destinations, conveyance operation of sheets is stopped. The image formation and the conveyance operation of sheets can be stopped at different time or can be stopped at the same time. In the present invention, it is possible to make a stop state different as appropriate, for example, it is possible to shift a state to a sleep state, or power off the apparatus.

Figure 10:
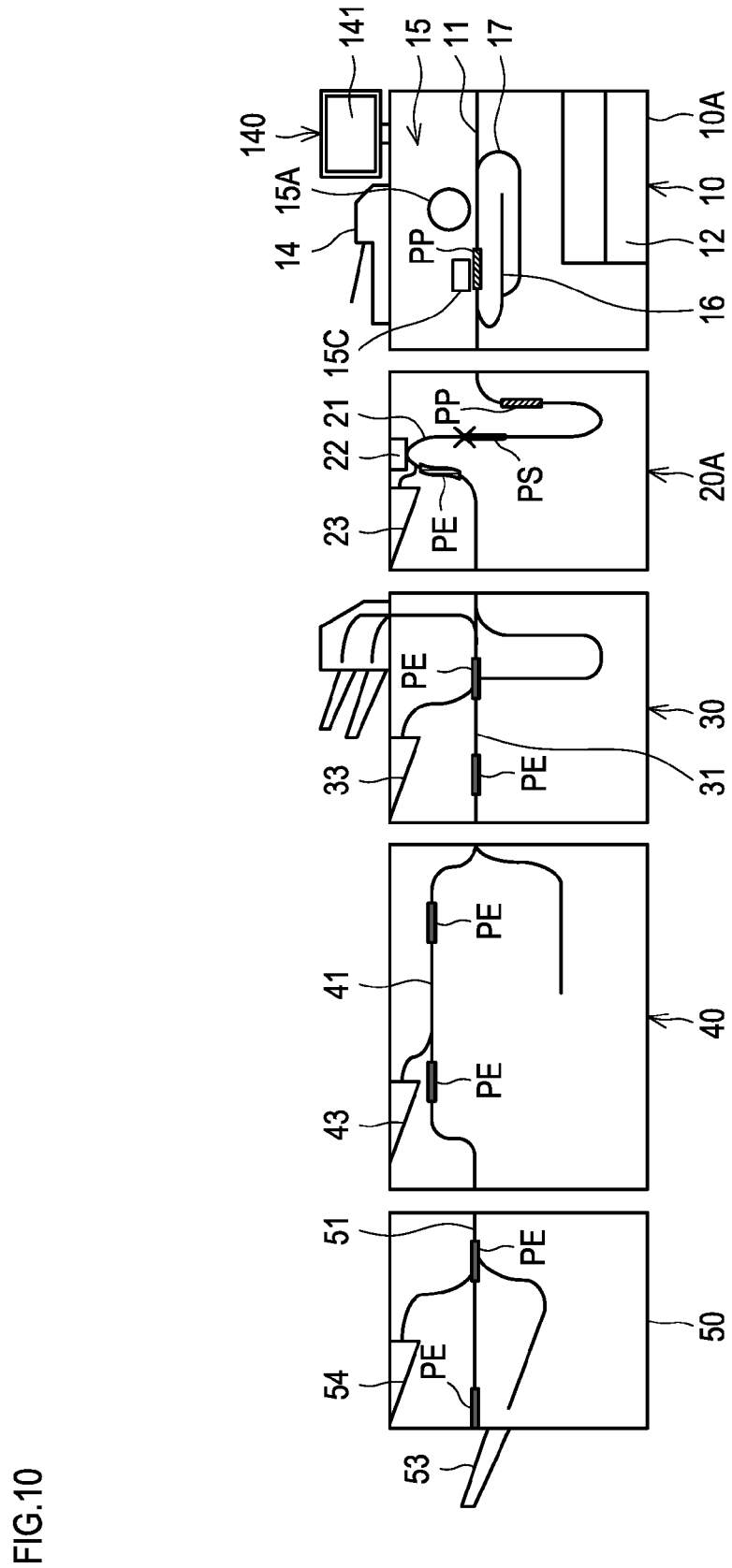
FIG. 10 is a diagram illustrating the image forming system when a paper jam occurs on an upstream side in an image reading apparatus according to one embodiment of the present invention.

While the position where a paper jam occurs can be any point on the conveyance path, there is a case where a paper jam occurs on an upstream side of the image reading unit. FIG. 10 illustrates the image forming system in which a paper jam occurs on the upstream side of the image reading unit 22. It should be noted that, in this example, in the first post-processing apparatus 20A, a paper discharge tray 23 is provided on a downstream side of the image reading unit 22.

The sheet PS which is an origin of the paper jam is located on the upstream side of the image reading unit 22 within the first post-processing apparatus 20 as described above. The sheet PP for adjustment is located on the conveyance path 21 on an upstream side of the sheet PS, and the sheet PP for adjustment also remains on the conveyance path 11 within the image forming apparatus in a similar manner. On the upstream side of the position where the paper jam occurs, valid sheets PE remain in the first post-processing apparatus 20, the second post-processing apparatus 30, the third post-processing apparatus 40 and the fifth post-processing apparatus 50.

When the control CPU 113 receives notification of occurrence of the paper jam, a position where the paper jam occurs, and whether or not prepurge can be performed, through the post-processing control unit 200, sheets on the downstream side of the position where the paper jam occurs are prepurged, and, for a sheet for correction, a sheet is not newly fed for outputting a predetermined number of sheets required for correction. The valid sheets PE on the downstream side of the position where the paper jam occurs are discharged to the normal paper discharge tray 53. Further, when there is a sheet for adjustment which is located on the downstream side of the position where the paper jam occurs and located on the upstream side of the image reading unit 22, the sheet for adjustment can be read by the image reading unit 22 and used for image formation correction. After an image for adjustment is printed, image formation can be stopped, and conveyance of sheets in the image forming system is stopped after prepurge.

When the position where the paper jam occurs is on a downstream side of the image reading unit 22, if the sheets being conveyed include a sheet for adjustment, a predetermined number of sheets required for adjustment are all outputted.

Figure 11:
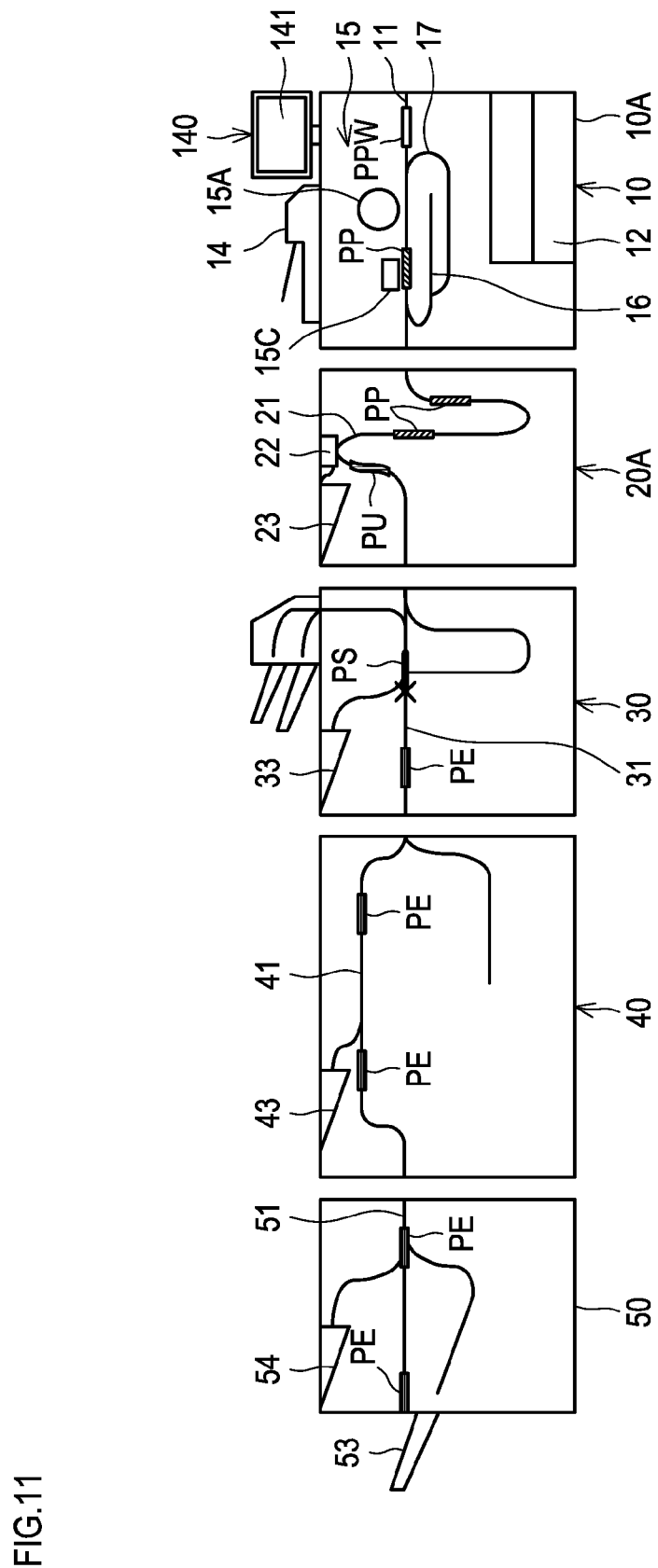
FIG. 11 is a diagram illustrating the image forming system when a paper jam occurs on a downstream side in the image reading apparatus, and a sheet for output concentration adjustment and a sheet on which printing is not performed are included according to one embodiment of the present invention.

FIG. 11 illustrates a state where a paper jam occurs in the second post-processing apparatus 30.

When the control CPU 113 receives notification of occurrence of the paper jam, the position where the paper jam occurs, and whether or not prepurge can be performed through the post-processing control unit 300, sheets located on the downstream side of the position where the paper jam occurs are prepurged, and, for a sheet for adjustment, a sheet is not newly fed for outputting a predetermined number of sheets required for adjustment.

Valid sheets PE located on the downstream side of the position where the paper jam occurs are discharged to the normal paper discharge tray 53. Further, when there is a sheet for adjustment on the upstream side of the position where the paper jam occurs, the sheet for adjustment is conveyed, read at the image reading unit 22, used for image formation adjustment, and discharged to a designated paper discharge destination. While there is no tray to which a sheet PU for normal job can be discharged, the sheet PU is sent as is to a JAM stop position to JAM, or immediately stopped. Further, an image for patch is formed on a sheet PPW for adjustment on which printing is not performed, and, after the image is read, the sheet PPW is discharged to the paper discharge tray 23. Still further, when the number of sheets is insufficient for correction, a sheet is newly fed, an image is printed and read, and the sheet is discharged to the paper discharge tray 23.

Figure 12:
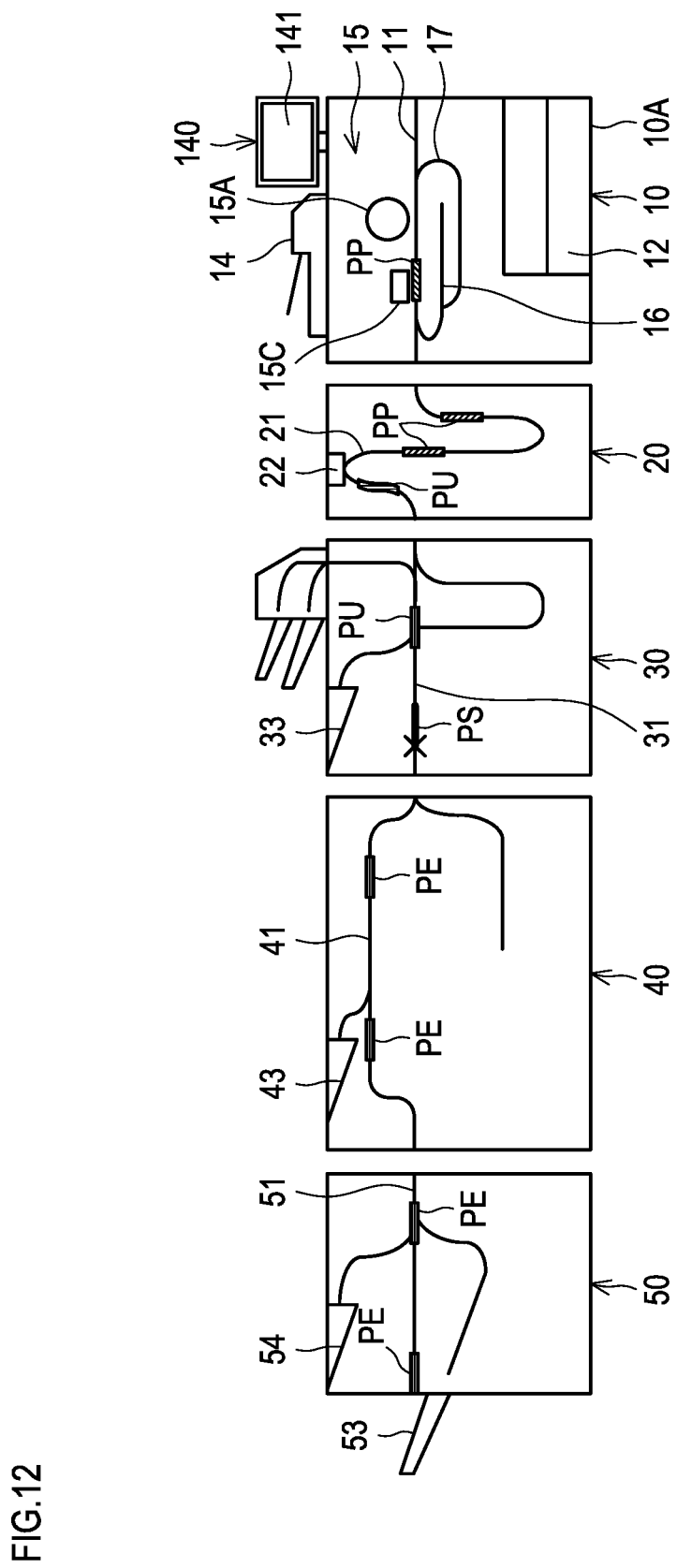
FIG. 12 is a diagram illustrating the image forming system when there is only one paper discharge destination on an upstream side of a position where a paper jam occurs upon occurrence of the paper jam according to one embodiment of the present invention.

While, in the above description, a case has been described where there are a plurality of paper discharge destinations on the upstream side of the position where the paper jam occurs, there is a case where there is only one paper discharge destination on the upstream side of the position where the paper jam occurs. FIG. 12 illustrates a state where a paper jam occurs on a downstream side of the paper discharge tray 33 in the second post-processing apparatus 30.

Figure 13:
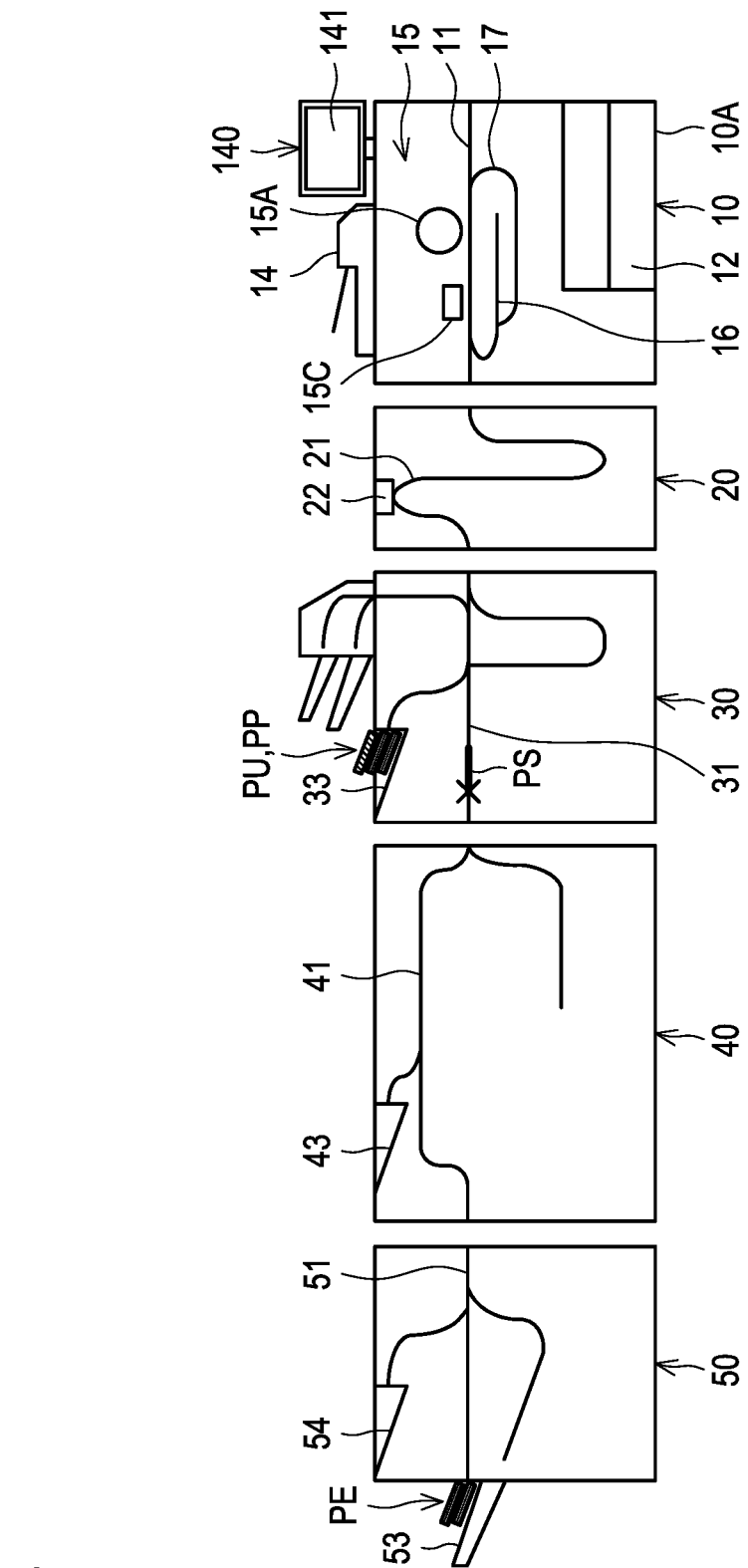
FIG. 13 is a diagram illustrating the image forming system in a state where prepurge is performed when there is only one paper discharge destination on an upstream side of the position where the paper jam occurs upon occurrence of the paper jam according to one embodiment of the present invention.

When the control CPU 113 receives notification of occurrence of the paper jam, a position where the paper jam occurs, and whether or not prepurge can be performed through the post-processing control unit 300, as illustrated in FIG. 13, sheets on a downstream side of the position where the paper jam occurs are prepurged, and sheets for correction of the predetermined number required for correction are outputted.

Valid sheets PE located on a downstream side of the position where the paper jam occurs are discharged to the normal paper discharge tray 53. Sheets PU for normal job located on an upstream side of the position where the paper jam occurs are discharged to the paper discharge tray 33 which is an only tray to which the sheets PU can be discharged. Further, when there is a sheet PP for adjustment on the upstream side of the position where the paper jam occurs, the sheet PP is conveyed, read at the image reading unit 22, used for image formation correction, and discharged to the paper discharge tray 33 which is an only tray to which the sheet PP can be discharged. Further, when there is a sheet for adjustment on which printing is not performed, an image for patch is formed, and, after the image is read, the sheet is discharged to the paper discharge tray 33. Still further, when the number of sheets is insufficient for adjustment, a sheet is newly fed, an image is printed and read, and the sheet is discharged to the paper discharge tray 33.

Further, there is also a case where a sheet for adjustment gets jammed other than a case where a sheet for normal job gets jammed.

Figure 14:
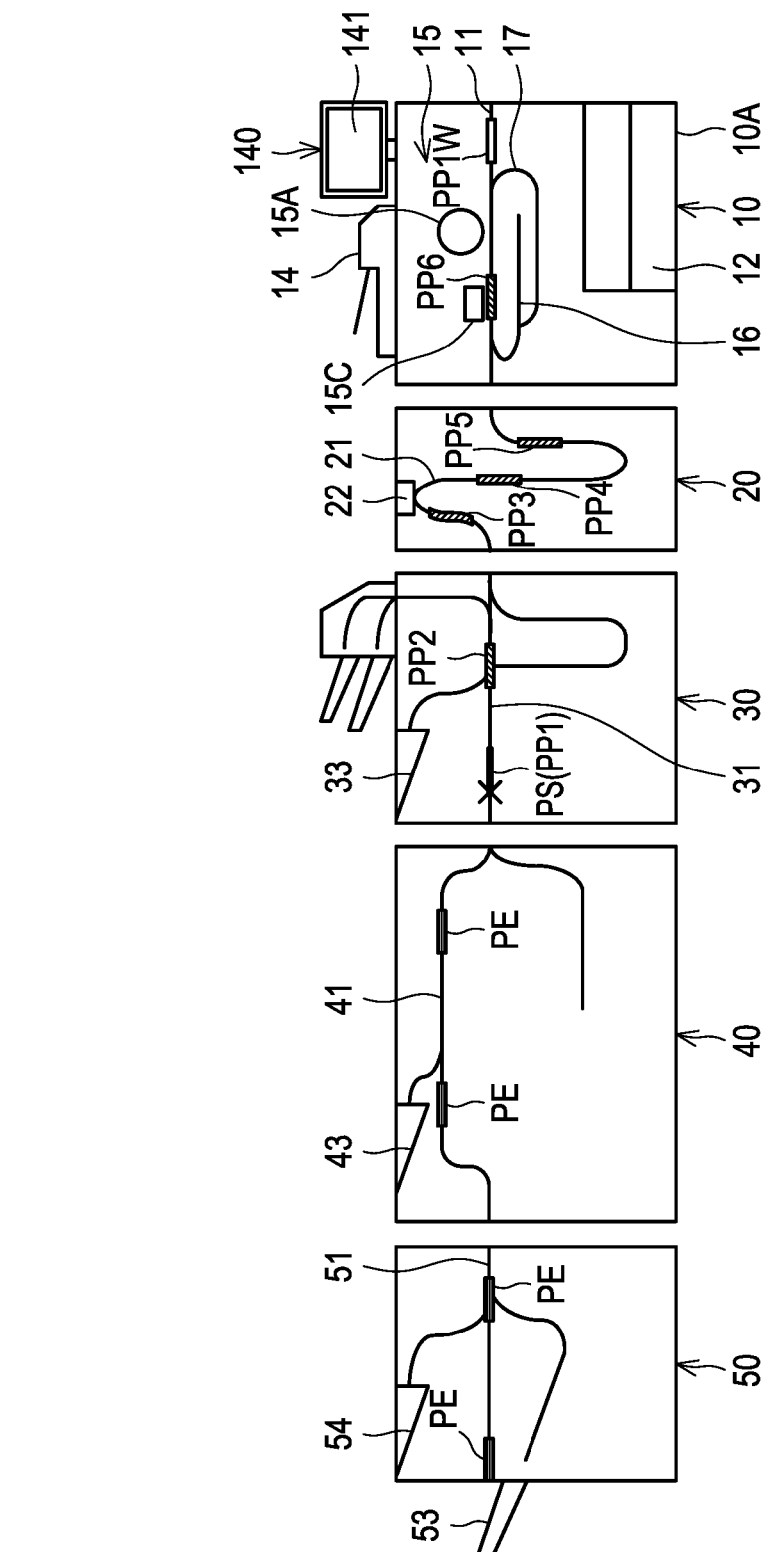
FIG. 14 is a diagram illustrating the image forming system when a sheet which causes a paper jam is a sheet for adjustment according to one embodiment of the present invention.

FIG. 14 illustrates a state where a first sheet PP1 for adjustment gets jammed on a downstream side of the paper discharge tray 33 of the second post-processing apparatus 30. On an upstream side, there is a second sheet PP2 for adjustment within the second post-processing apparatus 30, and there are successively a third sheet PP3 for adjustment, a fourth sheet PP4 for adjustment and a fifth sheet PP5 for adjustment in the first-post processing apparatus 20. In the image forming apparatus 10, a sixth sheet PP6 for adjustment remains, and on an upstream side of the sheet PP6, there is successively a sheet PP1W for adjustment before printing. It should be noted that, when the number of sheets is insufficient for correction, a sheet is newly fed.

The control CPU 113 which receives notification of occurrence of paper jam and a position where the paper jam occurs, continuously read images on the sheets PP4 to PP6 on which images are formed and transmit the sheets PP4 to PP6 to the control CPU 113 in order to continue image formation adjustment processing. An image for adjustment is formed on a sheet PP1W on which printing is not performed and used as a substitute for PP1, and read by the image reading unit 22. The sheet PP from which the image is read is discharged to the paper discharge tray 33 to which the sheet can be discharged. By this means, adjustment processing is performed on all the sheets of the predetermined number required for adjustment. After image formation is completed, the image formation is stopped, and, sheet conveyance is stopped after sheets PP are discharged. The image formation and the sheet conveyance can be stopped at different time or at the same time.

Figure 15:
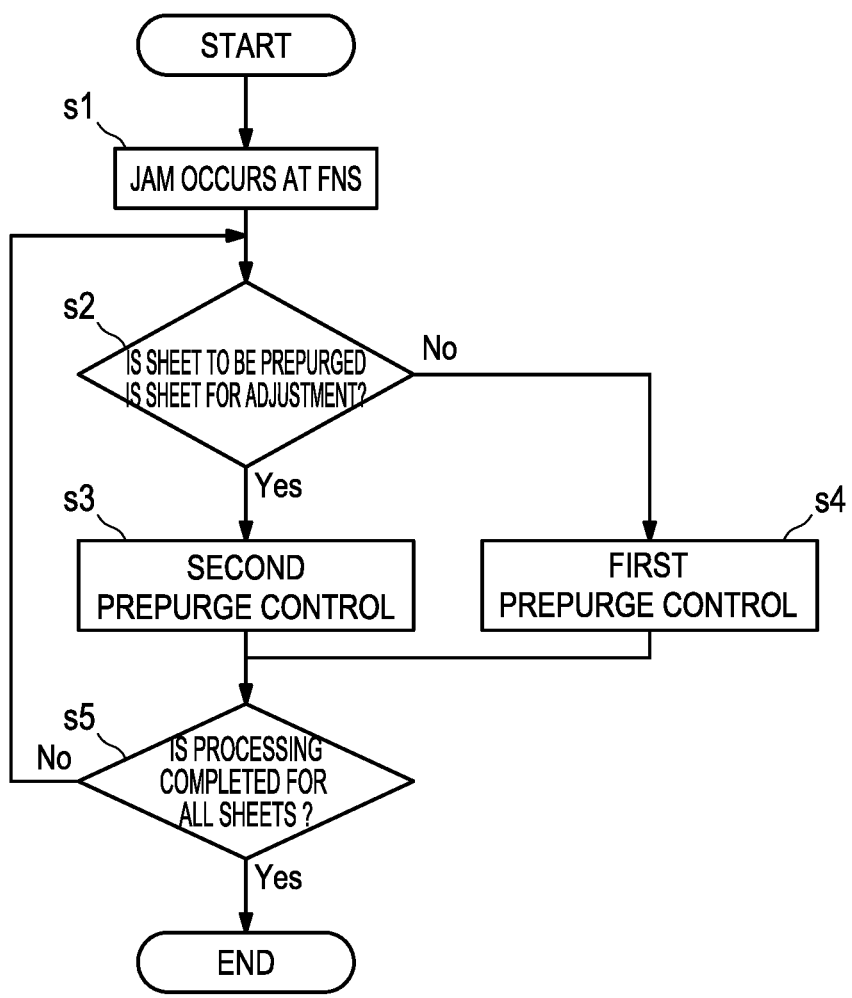
FIG. 15 is a flowchart illustrating procedure when a paper jam occurs upon image formation according to one embodiment of the present invention.

Processing procedure in the case where image formation correction processing overlaps with a paper jam will be described next based on a flowchart of FIG. 15. It should be noted that the following procedure is executed by control of the control unit.

When the image formation processing is started, it is notified that a paper jam occurs at the post-processing apparatus (step s1). Then, it is determined whether a sheet to be prepurged is a sheet for adjustment (correction) (step s2). When the sheet to be prepurged is a sheet for adjustment (step s2; Yes), second prepurge processing is performed (step s3). When the sheet to be prepurged is not a sheet for adjustment (step s2; No), first prepurge processing is performed (step s4). After step s3 and s4, it is determined whether processing is completed for all sheets (step s5). If the processing is completed for all sheets (step s5; Yes), the processing is finished. If the processing is not completed for all sheets (step s5; No), the processing shifts to step s2, and procedure for determining whether a sheet of the next page is a sheet for adjustment in a similar manner is repeated.

Figure 16:
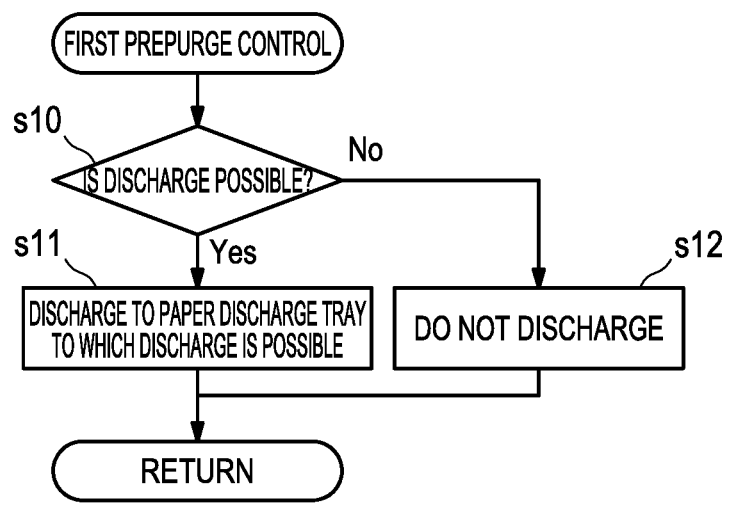
FIG. 16 is a flowchart illustrating control procedure of first prepurge according to one embodiment of the present invention.

First prepurge control will be described next based on a flowchart of FIG. 16. It should be noted that the following procedure is executed by control by the control unit.

First, it is determined whether or not a sheet can be discharged (step s10). When a sheet cannot be discharged (step s10; No), the processing shifts to a return destination, that is, step s5 without the sheet being discharged (step s12).

If a sheet can be discharged, the sheet is discharged to a paper discharge tray to which remaining sheets can be discharged (step s11), and the processing shifts to step s5 which is a return destination.

Figure 17:
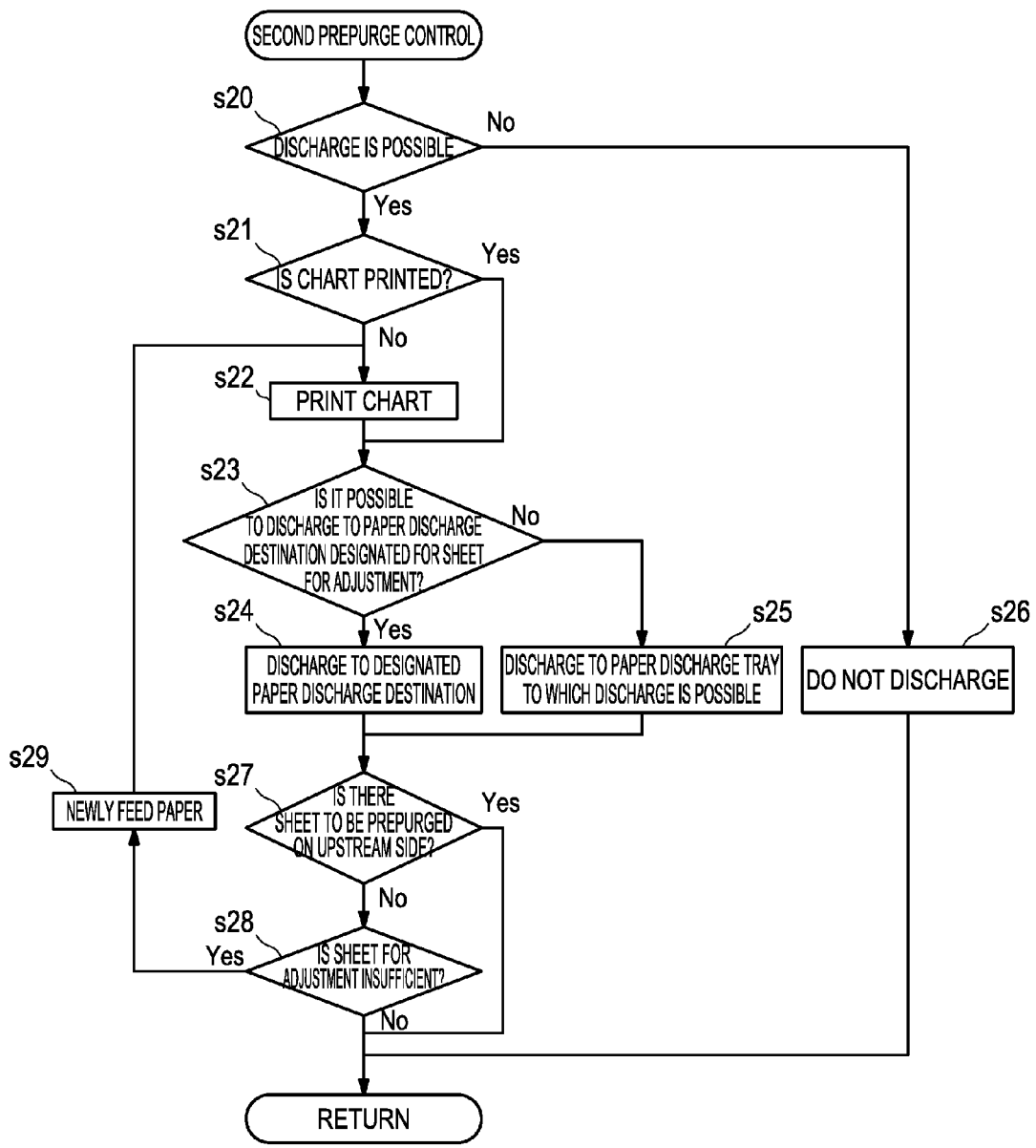
FIG. 17 is a flowchart illustrating control procedure of second prepurge according to one embodiment of the present invention.

The second prepurge control will be described based on a flowchart of FIG. 17. It should be noted that the following procedure is executed by control by the control unit.

First, it is determined whether a sheet can be discharged as with the above description (step s20). If a sheet cannot be discharged (step s20; No), the processing shifts to a return destination, that is, step s5 without the sheet being discharged (step s26).

If a sheet can be discharged, it is determined whether a chart has been printed (step s21). If the chart has not been printed (step s21; No), the chart is printed (step s22), and the processing shifts to step s23. If the chart has been printed (step s21; Yes), the processing shifts to step s23.

In step s23, it is determined whether or not a sheet can be discharged to a paper discharge destination designated for a sheet for adjustment (step s23). If a sheet can be discharged to the designated paper discharge destination (step s23; Yes), the sheet is discharged to the designated paper discharge destination (step s24), and, if a sheet cannot be discharged to the designated paper discharge destination (step s23; No), the sheet is discharged to a paper discharge tray to which the sheet can be discharged (step s25).

After step s23 and s24, it is determined whether there is a sheet to be prepurged on an upstream side (step s27). The sheet to be prepurged includes a sheet prepared for being fed. If there is a sheet to be prepurged on the upstream side (step s27; Yes), the processing shifts to step s5 which is a return destination. If there is no sheet to be prepurged (step s27; No), it is determined whether the number of sheets for adjustment is insufficient (step s28). If the number of sheets for adjustment is not insufficient (step s28; No), the processing shifts to step s5 which is a return destination. If the number of sheets for adjustment is insufficient (step s28; Yes), a sheet is newly fed (step s29), and the processing shifts to step s22, and procedure for printing a chart is repeated.

According to the present embodiment, when a JAM occurs on the conveyance path, if processing (prepurge processing) for discharging transfer media located on an upstream side of a position where the JAM occurs to a paper discharge destination to which the transfer media can be discharged overlaps with processing for performing image formation correction by reading images, by continuing the correction processing, it is possible to reduce waste sheets and recovery processing, and efficiently implement the correction processing.

While the present invention has been described above based on the above-described embodiment, the embodiment can be modified as appropriate unless the modification departs from the scope of the present invention.

What is claimed is:

1. An image forming apparatus comprising:
   a printer configured to perform printing on a transfer medium based on image data;
   a conveyor configured to convey the transfer medium; and
   a hardware processor configured to control the printing and the conveyance,
   wherein the hardware processor has a function of image formation correcting processing of performing correction of the printer in response to a reading result of an image printed on the transfer medium,
   the hardware processor has a function of prepurge processing of, when a paper jam occurs during conveyance of the transfer medium, performing control to discharge a valid transfer medium located on a conveyance path on a downstream side of a position where the paper jam occurs to outside the conveyance path, and discharge a transfer medium located on a conveyance path on an upstream side of the position where the paper jam occurs to outside the conveyance path, and when the paper jam occurs, and the transfer medium being conveyed includes a transfer medium for correction to be used for the image formation correcting processing, the hardware processor performs control to perform the prepurge processing and continue the image formation correcting processing.

2. The image forming apparatus according to claim 1, wherein the hardware processor forms a patch image on the transfer medium upon the image formation correcting processing and performs gamma correction of the image forming unit according to a reading result of the patch image.

3. The image forming apparatus according to claim 1, wherein, upon the prepurge processing, when the transfer medium is a transfer medium before image formation and is not a transfer medium for correction, the hardware processor discharges a blank transfer medium without an image being printed at the image forming unit.

4. The image forming apparatus according to claim 1, wherein, after the hardware processor executes printing on the transfer media of a predetermined number required for the correction by newly feeding a transfer medium if the number of transfer media required for the correction is insufficient, the hardware processor stops the image formation.

5. The image forming apparatus according to claim 1, wherein, when the paper jam occurs on an upstream side of an image reading apparatus, the hardware processor does not newly feed a transfer medium for performing printing on transfer media of a predetermined number required for the correction.

6. The image forming apparatus according to claim 1, wherein, when the paper jam occurs on a downstream side of an image reading apparatus, the hardware processor stops the image formation after executing printing on all transfer media of a predetermined number required for the correction.

7. The image forming apparatus according to claim 1, wherein, when the image formation correcting processing is continued, if the transfer medium before image formation is a transfer medium for correction, the hardware processor performs control to print an image for correction on the transfer medium for correction.

8. The image forming apparatus according to claim 1, wherein, when the image formation correcting processing is continued, after the image is read, the hardware processor discharges the transfer medium for correction to a paper discharge destination different from a paper discharge destination to which the transfer medium is discharged upon the prepurge processing.

9. The image forming apparatus according to claim 1, wherein, when the image formation correcting processing is continued, after the image is read, the hardware processor discharges the transfer medium for correction to a paper discharge destination which is the same as a paper discharge destination upon the prepurge processing if the transfer medium for correction cannot be discharged to a paper discharge destination different from a paper discharge destination to which the transfer medium is discharged upon the prepurge processing.

10. The image forming apparatus according to claim 1, wherein, when a transfer medium at which the paper jam occurs is the transfer medium for correction, the hardware processor stops the image formation after executing printing on all transfer media of the predetermined number required for the correction including the transfer medium for correction.

11. The image forming apparatus according to claim 1, wherein the hardware processor stops conveyance of transfer media after the prepurge processing.

12. The image forming apparatus according to claim 1, wherein the hardware processor receives a reading result of an image and a paper jam result from a posterior post-processing apparatus connected to the image forming apparatus.

13. An image forming system comprising an image forming apparatus and a post-processing apparatus, the image forming system comprising:
a printer configured to perform printing on a transfer medium based on image data;
a conveyor configured to convey the transfer medium; and
a hardware processor configured to control the printing and the conveyance,
wherein the hardware processor has a function of image formation correcting processing of performing correction of the image forming unit in response to a reading result of an image printed on the transfer medium,
the hardware processor has a function of prepurge processing of, when a paper jam occurs during conveyance of the transfer medium, performing control to discharge a valid transfer medium located on a conveyance path on a downstream side of a position where the paper jam occurs to outside the conveyance path, and discharge a transfer medium located on a conveyance path on an upstream side of the position where the paper jam occurs to outside the conveyance path, and
when the paper jam occurs, and the transfer medium being conveyed includes a transfer medium for correction to be used for the image formation correcting processing, the hardware processor performs control to perform the prepurge processing and continue the correction processing.

14. The image forming system according to claim 13, comprising an image reading apparatus in the post-processing apparatus.

15. The image forming system according to claim 13, comprising a plurality of the post-processing apparatuses.

16. The image forming system according to claim 15, wherein the plurality of post-processing apparatuses have one or two or more paper discharge destinations.

17. An image formation control method for controlling printing on a transfer medium at an image forming unit and conveyance of the transfer medium at a conveying unit, the image formation control method comprising:
a step of image formation correcting processing of performing correction of the image forming unit in response to a reading result of an image printed on the transfer medium;
a step of performing prepurge processing of, when a paper jam occurs during conveyance of the transfer medium, performing control to discharge a valid transfer medium located on a conveyance path on a downstream side of a position where the paper jam occurs to outside the conveyance path, and discharge a transfer medium located on a conveyance path on an upstream side of the position where the paper jam occurs to outside the conveyance path; and a step of, when the paper jam occurs, and the transfer medium being conveyed includes a transfer medium for correction to be used for the image formation correcting processing, performing control to perform the prepurge processing and continue the correction processing.

18. An image forming method, comprising:

a step of performing correction of image formation in response to a reading result of an image printed on a transfer medium;

a step of prepurge of, when a paper jam occurs during conveyance of the transfer medium, discharging a valid transfer medium located on a conveyance path on a downstream side of a position where the paper jam occurs to outside the conveyance path and discharging a transfer medium located on a conveyance path on an upstream side of the position where the paper jam occurs to outside the conveyance path; and a step of, when the paper jam occurs, and the transfer medium being conveyed includes a transfer medium for correction to be used for correction of image formation, performing processing of the prepurge and continuing correction processing of the image formation, wherein, upon the correction of the image formation, a patch image is formed on the transfer medium, and gamma correction of the image formation is performed according to a reading result of the patch image.

19. The image forming method according to claim 18, wherein, upon processing of the prepurge, if the transfer medium is a transfer medium before the image formation and is not a transfer medium for correction, a blank transfer medium is discharged without an image being printed.

20. The image forming method according to claim 18, wherein, after printing on transfer media of a predetermined number required for the correction is executed by a transfer medium being newly fed if the number of transfer media required for the correction is insufficient, the image formation is stopped.

* * * * *